(12) United States Patent
Leuthold et al.

(10) Patent No.: US 9,669,333 B2
(45) Date of Patent: Jun. 6, 2017

(54) FILTER MODULE AND MODULAR FILTER SYSTEM

(71) Applicant: Sartorius Stedim Biotech GmbH, Goettingen (DE)

(72) Inventors: Martin Leuthold, Goettingen (DE); Stefan Weisshaar, Adelebsen (DE); Christoph Schich, Goettingen (DE); Thomas Krumbein, Ebergoetzen (DE)

(73) Assignee: Sartorius Stedim Biotech GmbH (DE)

( * ) Notice: Subject to any disclaimer, the term of this patent is extended or adjusted under 35 U.S.C. 154(b) by 291 days.

(21) Appl. No.: 14/376,490

(22) PCT Filed: Feb. 8, 2013

(86) PCT No.: PCT/EP2013/000385
§ 371 (c)(1),
(2) Date: Aug. 4, 2014

(87) PCT Pub. No.: WO2013/117344
PCT Pub. Date: Aug. 15, 2013

(65) Prior Publication Data
US 2015/0001147 A1 Jan. 1, 2015

(30) Foreign Application Priority Data

Feb. 9, 2012 (DE) .................. 10 2012 002 540

(51) Int. Cl.
*B01D 29/05* (2006.01)
*B01D 29/56* (2006.01)
(Continued)

(52) U.S. Cl.
CPC ............. *B01D 29/05* (2013.01); *B01D 29/56* (2013.01); *B01D 63/082* (2013.01);
(Continued)

(58) Field of Classification Search
CPC ............ B01D 2313/04; B01D 2313/06; B01D 2313/19; B01D 2319/025; B01D 29/05; B01D 29/56; B01D 63/082; B01D 65/003
See application file for complete search history.

(56) References Cited

U.S. PATENT DOCUMENTS

| 3,943,057 A | 3/1976 | Jamet et al. |
| 4,702,835 A | 10/1987 | Cronenberger et al. |
| (Continued) | | |

FOREIGN PATENT DOCUMENTS

| EP | 1974801 | 10/2008 |
| WO | 9111248 | 8/1991 |

OTHER PUBLICATIONS

English translation WO 91//11248 (Aug. 1991).*
English translation of the International Preliminary Report on Patentability—Aug. 12, 2014.

*Primary Examiner* — John Kim

(57) ABSTRACT

One aspect of the invention relates to a filter module comprising: —a filter element having at least one filter medium which separates a filtrate side and a retentate side of the filter element from one another, and having a filter medium holder to which the filter medium is attached and which has at least one holder intake channel and at least one holder discharge channel, —a first filter cartridge part having at least one first cartridge intake channel and at least one first cartridge discharge channel, —a second filter cartridge channel having at least one second cartridge intake channel and at least one second cartridge discharge channel, wherein the filter medium holder is arranged in an arrangement position between the first filter cartridge part and the second filter cartridge part in a fluid-tight manner, wherein the at least one holder intake channel has a fluid connection with the at least one first cartridge intake channel and the at least one second cartridge intake channel, in order to form a
(Continued)

module intake channel, wherein the at least one holder discharge channel has a fluid connection with the at least one first cartridge discharge channel and the at least one second cartridge discharge channel, in order to form a module discharge channel, wherein the module intake channel has a fluid connection with the retentate side of the filter medium and wherein the module discharge channel has a fluid connection with the filtrate side of the filter medium, and a modular filter system.

12 Claims, 12 Drawing Sheets

(51) Int. Cl.
   *B01D 63/00* (2006.01)
   *B01D 65/00* (2006.01)
   *B01D 63/08* (2006.01)

(52) U.S. Cl.
   CPC ........ *B01D 65/003* (2013.01); *B01D 2313/04* (2013.01); *B01D 2313/06* (2013.01); *B01D 2313/19* (2013.01); *B01D 2319/025* (2013.01)

(56) References Cited

U.S. PATENT DOCUMENTS

| | | | |
|---|---|---|---|
| 4,751,153 A | 6/1988 | Roth | |
| 4,886,586 A | 12/1989 | Morris | |
| 5,599,447 A | 2/1997 | Pearl et al. | |
| 6,332,913 B1 | 12/2001 | Breitschwerdt et al. | |
| 6,929,743 B2 | 8/2005 | Diel | |
| 7,569,144 B2 | 8/2009 | De Biran et al. | |
| 2003/0066794 A1* | 4/2003 | Diel ..................... | B01D 63/082 210/227 |
| 2010/0282663 A1 | 11/2010 | Hunt | |

* cited by examiner

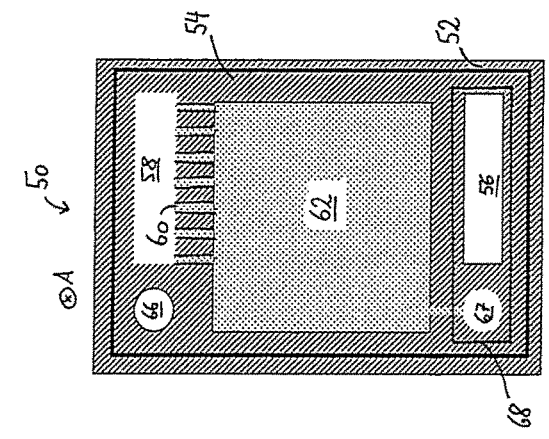
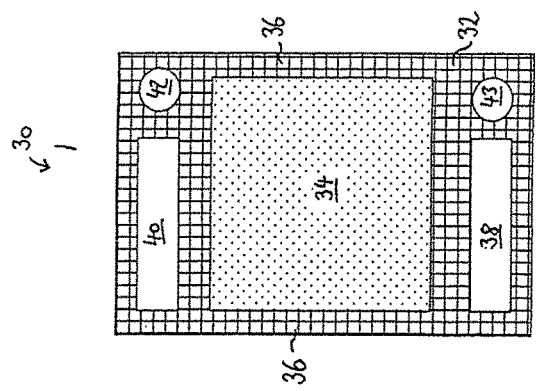
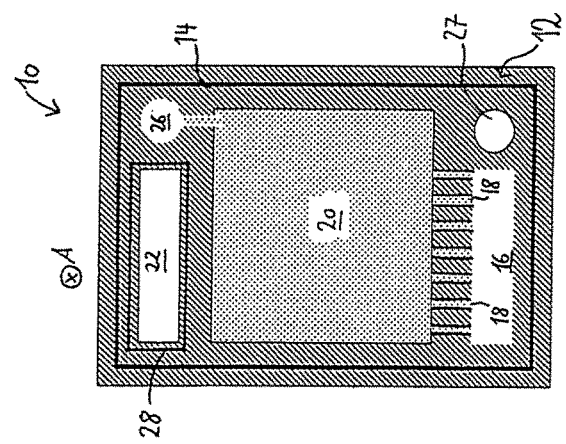
Fig. 1c
Fig. 1b
Fig. 1a

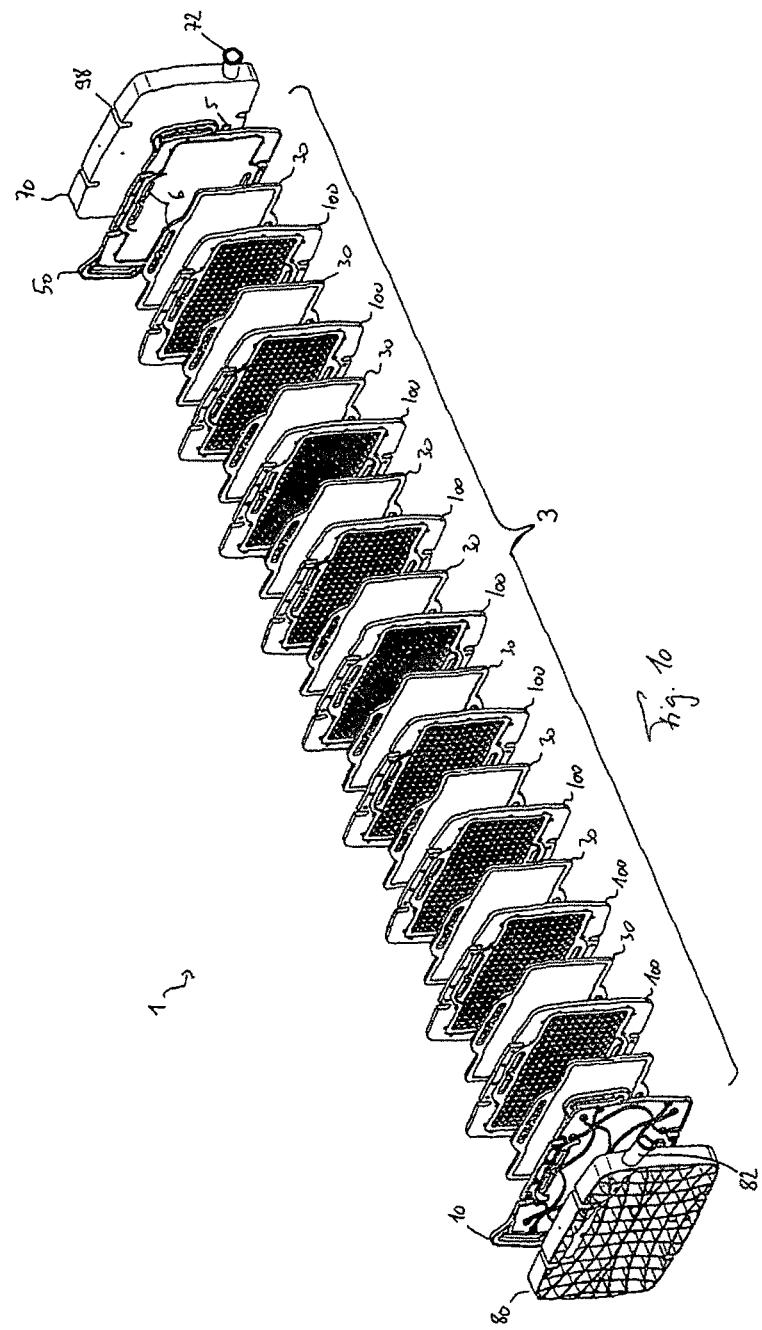

FILTER MODULE AND MODULAR FILTER SYSTEM

BACKGROUND OF THE INVENTION

Field of the Invention

The invention relates to a filter module and to a modular filter system.

Description of the Related Art

In order to obtain biotechnological products which are produced in bioreactors by way of micro-organisms or cell cultures, it is necessary as a rule to separate said products from further substances, such as the micro-organisms themselves, the nutrients and other contaminants. Depending on the type and quantity of the products which are to be obtained in the production process and depending on the production process, different filters with different filter properties and different filter capacity are necessary. The individual filters therefore have to be kept available in different filter capacities, or a parallel arrangement of a plurality of filters with a correspondingly lower capacity is necessary. However, the parallel arrangement of a plurality of filters requires complicated handling, since a multiplicity of hose connections have to be produced, as a result of which the risk of a faulty construction is also increased. Furthermore, the multiplicity of hose connections causes an increased dead volume of the construction and, as a result, a lower yield which is caused, in particular, by a lower filtration performance in relation to the filtration area.

It is therefore an object of the invention to provide a filter module and a filter system which is simpler to handle and makes an improved yield possible.

SUMMARY OF THE INVENTION

Filter Module

One aspect of the invention relates to a filter module comprising a filter element having at least one filter medium which separates a filtrate side and a retentate side of the filter element from one another, and a filter medium holder, to which the filter medium is fastened. The filter medium holder has at least one holder inflow channel and at least one holder outflow channel. The filter module further comprises a first filter cassette part having at least one first cassette inflow channel and at least one first cassette outflow channel, and a second filter cassette part having at least one second cassette inflow channel and at least one second cassette outflow channel. The filter medium holder is arranged in an arrangement position in a fluid-tight manner between the first filter cassette part and the second filter cassette part. The at least one holder inflow channel is connected fluidically to the at least one first cassette inflow channel and the at least one second cassette inflow channel to form a module inflow channel. The at least one holder outflow channel is connected fluidically to the at least one first cassette outflow channel and the at least one second cassette outflow channel to form a module outflow channel. The module inflow channel is connected fluidically to the retentate side of the filter medium, and the module outflow channel is connected fluidically to the filtrate side of the filter medium.

The filter element with the filter medium advantageously is protected against external mechanical and chemical influences by means of the first and second filter cassette part. In particular, the filter cassette parts form a contact protection means with regard to the filter medium, with the result that the filter element and the filter medium cannot be touched by hand. As a result, mechanical damage of the filter medium and contamination by way of contact are advantageously avoided. More advantageously, the filter media can be produced to be thinner on account of the contact protection means, since the filter media have to be designed for lower mechanical loading. In particular, the filter media do not have to be designed for punctiform loading. Furthermore, the filter media in the filter modules can always be arranged spaced apart from one another from further filter media in further filter modules which can be arranged on the filter module on account of the filter cassette parts. Mechanical loading between the individual filter media is advantageously avoided as a result.

The filter element comprises at least one filter medium, such as a membrane filter, a depth filter and/or an adsorption membrane filter. In particular, the filter element can have precisely one filter medium. It goes without saying, however, that the filter element can also comprise a plurality of similar or different filter media. For instance, the filter element can have a plurality of membrane filters in a plurality of layers. A plurality of depth filters or adsorption membrane filters can likewise be combined in a plurality of layers in the filter element.

Microfiltration membranes and ultrafiltration membranes are preferred as membrane filters. Adsorption membrane filters are to be understood to mean microporous membrane filters which carry functional groups on their inner and/or outer surface, which functional groups interact physically and/or chemically with substances which are contained in a fluid to be filtered. In the following text, chemical interaction is to be understood to mean any covalent, ionogenic bond interaction and/or any bond interaction which is based on electrostatic or hydrophobic (for example, van der Waals interaction) interactions between the functional groups of the substances and the adsorption membrane filter. The adsorption membrane filter preferably has functional groups which are selected from the group of the ion exchangers, salt-tolerant ligands, chelating agents, thiophilic or hydrophobic ligands of different chain lengths and configurations, "reversed-phase" ligands, reactive and other dyes, the organic and inorganic compounds, the affinity ligands and the proteins (in particular, enzymes).

Furthermore, different filters can also be combined in one filter element. For example, a plurality of layers of a membrane filter can be arranged between at least two layers of a depth filter or between two screen layers, in order to protect the membrane filter layers against mechanical loading and/or against clogging.

Nonwovens, felts, spunbonded fabrics, porous solids, sintered metals, ceramics, woven fabrics, paper, membranes and the like alone or in combination can be used as exemplary filter media. Furthermore, precoat filters with filter aids (for example, diatomite and/or adsorptive particles) can be used, the filter aids being fed in together with the fluid to be filtered or being already present in the filter module. The filter medium separates a filtrate side or permeate side and a retentate side of the filter element from one another. The terms filtrate and permeate and terms derived therefrom can be used synonymously. The filter medium is loaded from the retentate side with a fluid to be filtered. The fluid can comprise a liquid, in which solid substances are contained as a suspension and/or in which substances are dissolved. As an alternative or in addition, the fluid can comprise a gas or an aerosol. The substances that are retained by the filter medium remain on the retentate side if they do not penetrate into the filter medium. The filtered fluid passes through the filter medium to the filtrate side or the permeate side of the filter medium. There is a fluid pressure difference between the retentate side and the permeate side. The filter medium is preferably of substantially plate-shaped or flat configuration, the retentate side and the permeate side in each case forming opposite or opposed sides of the plate-shaped filter medium. In other words, the retentate side and the permeate side can be at a smaller spacing from one another than the two further longitudinal extents of the filter medium. As a result, the direction of flow of the fluid through the filter medium is oriented substantially perpendicularly with respect to the plane which is defined by the retentate side or the permeate side, with the result that the flow path of the fluid through the filter medium is, in particular, at a minimum and the effective cross section of the filter medium through which flow passes is at a maximum.

The filter medium is held in its position and/or in its shape by means of the filter medium holder, to which the filter medium is fastened. The filter medium holder preferably is formed at least in regions from a flexible material. The filter medium holder preferably is formed at least in regions, particularly preferably completely, from an elastic material such as a silicone, a rubber or a thermoplastic elastomer (TPE).

The filter medium preferably is fastened to the filter medium holder by fusing or casting a region of the filter medium to a region of the filter medium holder, the filter medium holding region. For example, the filter medium holder can be produced by injection molding, the filter medium being arranged during the injection molding in the injection mold in such a way that one edge of the filter medium is fused or molded into or cast with or in the elastic material of the filter medium holder, as a result of which a tight connection is produced between the filter medium and the filter medium holding region of the filter medium holder.

The arrangement position denotes the state of the filter module, in which the filter module is arranged on further filter modules and can be connected to the latter. In the arrangement position, the filter element bears at least in regions with the retentate side against a first filter element arrangement side of the first filter cassette part. In particular, a first sealing region of the filter element can be in contact with a complementary sealing region of the first filter cassette part in a mechanical and/or fluid-tight manner. The first sealing region preferably is formed on the filter medium holder. In particular, the filter medium holder that is formed from a flexible material or elastomer may form the first sealing region. The complementary sealing region of the first filter cassette part can comprise a sealing lug or a sealing web that preferably is formed in one piece with the first filter cassette part. The sealing lug or the sealing web can protrude in the direction of the filter element by from approximately 0.5 mm to approximately 2 mm, preferably approximately 1 mm. In particular for the case where the first sealing region of the filter element is formed from a flexible material or an elastomer, an increased contact pressure between the filter element and the first filter cassette part can be achieved in the region of the sealing web, with the result that an improved sealing action advantageously is achieved.

The filter medium preferably is fastened to the filter medium holder by clamping and/or adhesive bonding of one region of the filter medium with the filter medium holding region.

The filter medium holder can be, for example, of two-piece configuration, the first part of the filter medium holder having a filter medium receptacle that is designed to receive the filter medium along an introduction direction. Furthermore, the second part of the filter medium holder can be capable of being introduced at least in regions into the filter medium receptacle by way of a clamping region that is of substantially complementary configuration with respect to the filter medium receptacle to clamp the filter medium in the filter medium receptacle firmly. In addition, the filter medium can be bonded adhesively in the filter medium receptacle firmly by means of an adhesive, for example by way of a silicone.

The filter medium receptacle can preferably have at least one sealing contour, for example a sealing lip that can run around the filter medium receptacle. Further preferably, the clamping region can likewise have at least one sealing contour, for example a sealing lip that can run around the clamping region. The filter medium can be arranged or clamped between the sealing contours of the filter medium receptacle and the clamping region, as a result of which the filtrate side and the retentate side of the filter medium advantageously can be separated in a fluid-tight manner. It goes without saying that two, three, four or more sealing contours can also be arranged parallel to one another.

The filter medium preferably is arranged on the filter medium holder in a non-positive and/or positively locking manner. For example, the filter medium holder can have a groove, into which the filter medium is inserted to be held therein. In particular, the filter medium can be clamped firmly in the grooves and optionally can be bonded adhesively and firmly. As an alternative, the filter medium can be fastened to the filter medium holder without firm clamping by means of an adhesive, for example a polymer or a silicone adhesive. The filter medium holder preferably is configured in one piece.

The filter medium holder can be configured to be flexible and/or flexibly expandable to facilitate the insertion of the filter medium into the groove. As a result, an opening in the filter medium holder can be increased by way of expansion of the filter medium holder so that it is possible to insert the filter medium into the opening and to introduce it into the groove. Afterward, the filter medium holder can return into its original shape on account of its flexibility, as a result of which the opening is reduced in size in such a way that the filter medium cannot be removed again from the filter medium holder or from the groove.

The filter medium preferably is clamped in the filter medium holder, with a pressing force being applied to the filter medium by way of the flexible material of the filter medium holder. In other words, the filter medium can be clamped in the filter medium or in its groove, with a mechanical stress or pressing force that acts on the filter medium being produced by way of the flexible or elastic material of the filter medium holder. The filter medium holder preferably can be stressed around the filter medium, with the result that a contact pressure is generated at the edge of the filter medium. In particular, the filter medium can be arranged in a groove in the filter medium holder, with it being possible for the contact pressure to be exerted on the filter medium by the bottom of the groove. The sealing action then is produced by pressing the filter medium holder onto the filter medium. Here, one edge of the filter medium of from approximately 2 mm to approximately 20 mm, preferably from approximately 5 mm to approximately 10 mm, can act as sealing face and can be introduced into the groove of the filter medium holder.

At least one sealing contour or sealing lip that is designed to come into contact with the retentate side of the filter medium that is arranged in the groove can preferably be formed in the interior of the groove of the filter medium holder. More preferably, at least one sealing contour or sealing lip that is designed to come into contact with the permeate side of the filter medium that is arranged in the groove can be formed in the interior of the groove of the filter medium holder. In particular, the two sealing contours or sealing lips can be formed on opposite or opposed sides of the groove. Here, the sealing contours or sealing lips can be formed from a flexible or elastic material and can be deformed flexibly or elastically at least in regions by way of the arrangement of the filter medium.

The sealing contours or sealing lips preferably are formed in one piece with the filter medium holder.

More preferably, the filter medium can be formed from two, three or more layers, and/or two, three or more filter media can be arranged in the filter medium holder or can be fastened thereto. Here, the filter medium can be formed by a multiplicity of identical layers or by way of different layers.

Accordingly, in the arrangement position, the filter element bears at least in regions with the filtrate side against a second filter element arrangement side of the second filter cassette part. In particular, a second sealing region of the filter element can make contact with a complementary sealing region of the second filter cassette part in a mechanical and/or fluid-tight manner. The second sealing region preferably is formed on the filter medium holder. In particular, the filter medium holder that preferably is formed from a flexible material or elastomer can form the second sealing region. The complementary sealing region of the second filter cassette part can comprise a sealing lug or sealing web that preferably is configured in one piece with the second filter cassette part. The sealing lug or the sealing web can protrude in the direction of the filter element by from approximately 0.5 mm to approximately 2 mm, preferably approximately 1 mm. In particular for the case where the second sealing region of the filter element is formed from a flexible material or an elastomer, an increased contact pressure between the filter element and the second filter cassette part can be achieved in the region of the sealing lug, with the result that an improved sealing action advantageously is achieved.

The filter medium preferably has a lower thickness than the filter medium holder. It goes without saying, however, that the thickness of the filter medium can be the same as the thickness of the filter medium holder, with the result that the retentate side of the filter medium terminates flush with the retentate side of the filter medium holder, and the filtrate side of the filter medium terminates flush with the filtrate side of the filter medium holder.

The filter medium can be fastened to the filter medium holder in such a way that a retentate chamber is formed in the arrangement position between the retentate side of the filter medium or the filter element and the first filter element arrangement side of the first filter cassette part. To this end, the first filter cassette part can have a retentate recess, with the result that a retentate chamber is formed even when the retentate side of the filter medium terminates flush or in a flat manner with the retentate side of the filter medium holder. As an alternative or in addition, the retentate chamber can be formed at least in regions by the filter element, preferably by virtue of the fact that a recess is formed by the filter medium holder and the filter medium. For example, the retentate side of the filter medium holder can protrude in the direction of the first filter cassette part, in relation to the retentate side of the filter medium.

Furthermore, the filter medium can be fastened to the filter medium holder in such a way that a filtrate chamber is formed in the arrangement position between the filtrate side of the filter medium or the filter element and the second filter element arrangement side of the second filter cassette part. To this end, the second filter cassette part can have a filtrate recess, with the result that a filtrate chamber is formed even when the filtrate side of the filter medium terminates flush or in a flat manner with the filtrate side of the filter medium holder. As an alternative or in addition, the filtrate chamber can be formed at least in regions by the filter element, preferably by virtue of the fact that a recess is formed by the filter medium holder and the filter medium. For example, the filtrate side of the filter medium holder can protrude in the direction of the second filter cassette part, in relation to the filtrate side of the filter medium.

In order to provide the fluid to be filtered on the retentate side of the filter medium or in the retentate chamber of the filter module, a fluidic connection can be formed between the module inflow channel and the retentate chamber or the retentate side of the filter medium by means of at least one module inflow connecting channel, it being possible for the at least one module inflow connecting channel to be formed at least partially in the filter medium holder and/or the first filter cassette part. Accordingly, at least one module outflow connecting channel can be provided to discharge the filtered fluid from the filtrate side to the module outflow channel. In other words, the filtrate side of the filter medium or the filtrate chamber is connected fluidically to the module outflow channel of the filter module in the arrangement position by means of the at least one module outflow connecting channel. The at least one module outflow connecting channel can be formed at least partially in the filter medium holder and/or the second filter cassette part.

It goes without saying that a single module inflow channel or two or more module inflow channels can be provided and can be connected fluidically in each case by an associated module inflow connecting channel to the retentate chamber. Correspondingly, a single module outflow channel or two or more module outflow channels can be provided and can be connected fluidically in each case by an associated module outflow connecting channel to the filtrate chamber.

The at least one module inflow channel comprises in each case one associated first cassette inflow channel of the first filter cassette part, in each case one associated second cassette inflow channel of the second filter cassette part, and in each case one associated holder inflow channel, that are connected to one another fluidically in the arrangement position of the filter module. The associated first and second cassette inflow channels and the holder inflow channel preferably are configured to be congruent in terms of shape with respect to one another, in order to form a continuous module inflow channel with a substantially constant cross section in the arrangement position. To this end, the first and second filter cassette parts and the filter medium holder can be arranged to fit one another in such a way that the cross sections of the first and second cassette inflow channels and the holder inflow channel come into congruence along a direction parallel to the fluid flow direction F.

In an analogous way, the at least one module outflow channel can comprise in each case one associated first cassette outflow channel of the first filter cassette part, in each case one associated second cassette outflow channel of the second filter cassette part, and in each case one associated holder outflow channel, that are connected to one another fluidically in the arrangement position of the filter module. The associated first and second cassette outflow channels and the holder outflow channel preferably are configured to be congruent in terms of shape with respect to one another, in order to form a continuous module outflow channel with a substantially constant cross section in the arrangement position. To this end, the first and second filter cassette parts and the filter medium holder can be arranged to fit one another in such a way that the cross sections of the first and second cassette outflow channels and the holder outflow channel come into congruence along a direction parallel to the fluid flow direction F.

The individual sections of the module inflow channel and the module outflow channel in the filter module are connected to one another in a fluid-tight manner in the arrangement position. The fluid-tight connection preferably takes place by an arrangement of the filter medium holder between the first filter cassette part and the second filter cassette part. A contact pressure then is applied to press the retentate side of the filter element onto the first filter element arrangement side of the first filter cassette part and the filtrate side of the filter element onto the second filter element arrangement side of the second filter cassette part. As a result, a sufficient fluid-tight seal is produced and prevents fluid from escaping at the connecting faces between the filter element and the first and second filter cassette part.

The first filter cassette part and the second filter cassette part can preferably be locked or connected to one another by a locking device. The first filter cassette part preferably can have at least one latching device that is latched or locked with an associated complementary latching device in the arrangement position. For latching or locking, the at least one latching device can be introduced along an arrangement direction A into the associated complementary latching device, until the latching or the locking takes place and the filter module moves into the arrangement position. Further preferably, the locking or latching can no longer be released, as soon as the filter module is situated in the arrangement position. This advantageously prevents the filter module from being opened subsequently. As a result, mechanical damage of the filter medium is prevented. The filter module preferably is designed as a disposable module that is thrown away or destroyed after use, with the result that access to the filter element or the filter medium is not necessary. Rather, contaminations can be prevented by the retentate which is collected in the filter module after use, since the retentate remains in the filter module which cannot be opened.

At least one of the first filter cassette part and the second filter cassette part may have a higher rigidity than the filter medium holder. In other words, the modulus of elasticity and/or the shear modulus of at least one of the first and/or the second filter cassette part may be greater than the modulus of elasticity and/or the shear modulus of the filter medium holder. For example, the filter cassette parts can be formed from a rigid material such as polyethylene (PE), polypropylene (PP), polyurethane (PU), acrylonitrile butadiene styrene copolymer (ABS), polyamide (PA) or polycarbonate (PC). In contrast, the filter medium holder preferably is formed from an elastic material, such as a silicone, a rubber or a thermoplastic elastomer (TPE). The materials of the filter cassette parts and the filter medium holder preferably can be sterilized by gamma radiation.

An improved dimensional accuracy of the entire filter module advantageously results from the increased rigidity or stiffness of the filter cassette parts with regard to extension, compression and/or torsion with respect to the filter medium holder.

Furthermore, the filter cassette parts can withstand forces that act on the filter module from the outside in an improved manner, in particular if a plurality of filter modules are combined in one arrangement. For example, a plurality of filter modules can be loaded during proper operational usage with a pressing force K that presses a plurality of filter modules together, in order to obtain a fluid-tight connection between the filter modules. This also results in improved dimensional accuracy of the filter medium holder that is held between the filter cassette parts under operating conditions, that is to say if an internal or external pressure is applied by the fluid to be filtered or if a contact pressure is applied to hold the individual filter modules together in the arrangement. The improved and constant dimensional accuracy of the filter medium holder and therefore of the filter medium during operation advantageously avoids a preferred through-flow of one individual filter module resulting during the parallel operation of a plurality of identical filter modules. This is to be avoided, since otherwise a breakthrough of the substance to be filtered can take place in one of the filter modules of the arrangement at a time at which filter capacity is still unutilized in the other filter modules. The filtering advantageously is improved and the filter capacity is increased b avoiding the breakthrough. As a result, the costs of the filter process can also be reduced, in particular in the case of filtration operations that are based on adsorptive processes.

It is a further advantage that the filter medium is protected against mechanical influences or deformations as a result of forces that act from the outside. As a result, the filter media advantageously can be thinner with the same capacity. Less expensive filter modules can be provided as a result.

The first filter cassette part preferably has a first filter element receptacle and/or the second filter cassette part preferably has a second filter element receptacle, into which the filter medium holder can be received at least in regions along the arrangement direction A. At least one of the first and second filter element receptacles preferably is configured so that the first filter cassette part and the second filter cassette part are spaced apart from one another by the filter medium holder in the arrangement position. In other words, the sum of the recess depths of the first and second filter element receptacle, if present, is smaller than the thickness of the filter element or the filter medium holder along the arrangement direction A. For example, a gap of from approximately 1 mm to approximately 10 mm, preferably from approximately 2 mm to approximately 5 mm, can remain between the first and second filter cassette part in the arrangement position.

The filter element receptacle preferably comprises at least one sealing web. At least one of the cassette inflow channel and the at least one cassette outflow channel preferably is surrounded by an associated sealing web. At least one of the retentate chamber and the filtrate chamber preferably is surrounded by a sealing web. The sealing web preferably has a height of from approximately 0.5 mm to approximately 5 mm. In the arrangement position, the sealing web is covered completely by the filter medium holder or the filter element.

The first filter cassette part is preferably identical to the second filter cassette part. In particular, the first and second filter cassette part can be configured in each case to be point-symmetrical with respect to a center point of the filter cassette part or in each case to be mirror-symmetrical with respect to a mirror axis.

A filter module connection configuration preferably formed on that side of the first filter cassette part that lies opposite or is opposed to the first filter element arrangement side of the first filter cassette part. The filter module connection configuration is designed to connect a further filter module to the filter module in a fluid-tight manner, the further filter module having a complementary filter module connection configuration. The filter module connection configuration can preferably comprise in each case sealing webs around the at least one module inflow channel and/or the at least one module outflow channel. The sealing webs can be configured in one piece with the first and second filter cassette part. As an alternative, sealing rings can be provided for the fluid-tight connection. The sealing rings are preferably held in a complementary sealing ring groove of the corresponding filter cassette part. The sealing rings preferably are formed from an elastomer.

A corresponding filter module connection configuration for connecting a further filter module also preferably can be formed on that side of the second filter cassette part that lies opposite or is opposed to the second filter element arrangement side of the second filter cassette part.

The filter module preferably comprises a third filter cassette part and a second filter element. The second filter element is preferably identical to the first filter element. In this configuration, the first filter element is arranged or received on the first filter cassette part and the second filter element is arranged or received on the second filter cassette part, whereas the third filter cassette part is arranged between the first and second filter element. In a further preferred embodiment of the invention, two or more of the abovementioned third filter cassette parts can be arranged between the first and the second filter element, each of the third filter cassette parts being assigned an additional filter element.

The third filter cassette part preferably has a third filter element arrangement side that is identical to the second filter element arrangement side of the second filter cassette part. The third filter cassette part further preferably has a fourth filter element arrangement side that is identical to the first filter element arrangement side of the first filter cassette part. For example, the third filter cassette part can be formed by connection or common formation of the first and second filter cassette part.

The third filter cassette part is further preferably free from continuous openings and channels, in particular in the direction of the arrangement direction. By way of the third filter cassette part, the first and second cassette inflow channels and the first and second cassette outflow channels and further optional channels of the first and second filter cassette parts can therefore be separated from one another fluidically. In other words, the third filter cassette part preferably separates the first filter cassette part and the first filter element from the second filter cassette part and the second filter element. A single filter module can advantageously be used to carry out two (in particular, different) filter processes at the same time or in a staggered manner.

Two filter elements can be accommodated in a single filter module by means of the third filter cassette part. Here, the third filter cassette part can be locked or latched together releasably or non-releasably to the first and second filter cassette part in the arrangement position by means of a locking device. The locking between the first and second filter cassette part preferably is replaced by an indirect locking via the third filter cassette part. It goes without saying that the first, second and third filter cassette parts can also be locked to one another jointly by means of one locking device.

Two or more third filter cassette parts preferably are arranged between the first and the second filter element, each of the third filter cassette parts being assigned an additional filter element. In this way, three or more filter elements can advantageously be combined in one filter module. The third filter cassette parts can be locked to one another releasably or non-releasably. One of the two or more third filter cassette parts can preferably be free from continuous openings and channels, in particular in the direction of the arrangement direction.

The first filter cassette part preferably has a first cassette ventilating channel that can be connected fluidically to the retentate chamber. Further preferably, the second filter cassette part has a second cassette ventilating channel and the filter element or the filter medium holder has a holder ventilating channel. In the arrangement position of the filter module, a module ventilating channel can be formed by means of the first cassette ventilating channel, the holder ventilating channel and the second cassette ventilating channel. Air can advantageously be discharged from the internal volumes of the filter system by means of the module ventilating channel at the beginning of a filtration. Here, it is further advantageously not necessary to allow the air to flow through the filter medium, as a result of which the necessary pressure for ventilation would be reduced. During proper operational usage of the filter module, the module ventilating channel can be connected to the outside or the surroundings or the atmosphere until the ventilation is completed and fluid enters into the module ventilating channel. Afterward, the connection can be disconnected or closed. In particular, the connection to the outside can take place via a sterile filter that preferably retains microorganisms, such as bacteria, funguses or viruses.

The first filter cassette part preferably has a first cassette drainage channel. The second filter cassette part further preferably has a second cassette drainage channel that can be connected fluidically to the filtrate chamber. The filter element or the filter medium holder preferably has a holder drainage channel. In the arrangement position of the filter module, a module drainage channel can be formed by means of the first cassette drainage channel, the holder drainage channel and the second cassette drainage channel. Fluid can advantageously be discharged from the internal volumes of the filter system, for example from the filtrate chambers, by means of the module drainage channel at the end of a filtration. During the proper operational usage of the filter module, the module drainage channel can be closed and can be connected to the outside only after the end of the filtration.

Filter System

Another aspect of the invention relates to a modular filter system comprising a first termination module a second termination module and at least one of the above-described filter modules is arranged between the first and second termination module. The module inflow channel of the at least one filter module is connected fluidically to a fluid inflow of the first and/or second termination module, and the module outflow channel of the at least one filter module is connected fluidically to a fluid outflow of the first and/or second termination module.

A plurality of identical filter modules and/or a plurality of different filter modules with different filter media can advantageously be combined in one filter system in a simple way. The filter system can therefore be scaled as desired in a simple way. A total of one, two, three, four or more filter modules can be arranged between the two termination modules and can be connected fluidically to the termination modules and among one another. Here, the individual module inflow channels of the filter modules can form one inflow channel that is connected fluidically to the fluid inflow. Correspondingly, the individual module outflow channels can form one outflow channel that is connected fluidically to the fluid outflow. Furthermore, the filter media or the filter holders in the filter modules of the filter system among one another always spaced apart from one another by means of the filter cassette parts of the filter modules. As a result, mechanical loading between the individual filter media or filter holders advantageously is avoided.

Here, the filter system can preferably be configured so that the first termination module has the fluid inflow and the second termination module has the fluid outflow. As a result, a throughflow of the filter system takes place from the first termination module in the direction of the second termination module.

As an alternative, the filter system can be configured so that the first termination module has the fluid inflow and the fluid outflow. As a result the fluidic connection of the fluid inflow and the fluid outflow can take place exclusively at one end of the filter system. The second termination module then serves merely to terminate the inflow channel and the outflow channel on one side.

Further alternatively, in each case one fluid inflow and one fluid outflow can be provided in the first and second termination module. In particular if a preferred filter module is used with three filter cassette parts, the filter module has two internal volumes that are separated from one another fluidically. Thus, an associated fluid inflow and fluid outflow can be provided for each of the internal volumes. As a consequence, two filtration processes can be carried out independently and separate from one another fluidically.

The fluidic connection between the first termination module and a filter module that is arranged thereon can take place via a first complementary filter module connection configuration of the first connection module. Correspondingly, the second termination module can have a second complementary filter module connection configuration that can be connected in a fluid-tight manner to the filter module connection configuration of a filter module.

The first termination module and/or the second termination module can preferably be locked or latched releasably or non-releasably by means of a locking device to a filter module that is arranged thereon. Here, the locking or latching can take place in accordance with the latching of the filter cassette parts among one another. In an analogous manner, the filter modules can also be locked or latched releasably or non-releasably among one another by means of a locking device.

The termination modules and the filter module or filter modules arranged between them can preferably be loaded with a pressing force K by way of a pressing apparatus. As a result, the filter module connection configurations and the associated complementary filter module connection configurations are loaded with a predefined contact pressure. The pressing force K preferably is applied by means of the pressing apparatus on that side of the first connection module which lies opposite the first complementary filter module connection configuration of the first connection module and acts in the direction of the second termination module. Correspondingly, an equally great pressing force K preferably is applied on that side of the second connection module that lies opposite the second complementary filter module connection configuration of the second connection module, and acts in the direction of the first termination module. The first and second filter cassette parts of the filter modules preferably can be displaced with respect to one another by the pressing force K. As a result, the filter medium holders in the filter modules and formed from a flexible or elastic material are prestressed, as a result of which the fluid-tight seal during proper operational usage of the filter system advantageously is increased.

A plurality of or all filter modules of the filter system can preferably be operated in parallel. In other words, the retentate sides of the filter media of a plurality of or all filter modules can be connected fluidically to the fluid inflow via the inflow channel. Correspondingly, the filtrate sides of the filter media are connected fluidically via the outflow channel to the fluid outflow.

At least one first and one second filter module can preferably be connected one behind another in series. In other words, the retentate side of the filter medium of the second filter module is connected fluidically to the filtrate side of the filter medium of the first filter module. In this case, the module inflow channel of the second filter module and the module outflow channel of the first filter module have to be connected to one another fluidically, it being necessary to avoid a direct fluidic connection of the module inflow channels of the two filter modules among one another and the module outflow channels of the two filter modules among one another. The filter system preferably has a separating module that closes the module inflow channel of the first filter module in the direction of the second filter module, connects the module outflow channel of the first filter module fluidically to the module inflow channel of the second filter module, and closes the module outflow channel of the second filter module in the direction of the first filter module.

Different filter methods therefore advantageously can be applied one behind another to a fluid by one filter system, and improved scalability advantageously is achieved. For example, the fluid can first of all be freed from coarse suspended substances by way of a fabric filter, can be freed in the second step from fine suspended substances by way of a finer fabric filter, and can subsequently pass a membrane adsorption filter, the latter not being blocked.

The filter system preferably comprises a first filter module and a second filter module and a separating device that closes the module inflow channel of the first filter module, with the module inflow channel being separated fluidically from the module outflow channel of the second filter module.

In the following text, preferred embodiments of the present invention will be explained by way of example using the appended drawings

BRIEF DESCRIPTION OF THE DRAWINGS

FIG. 1a is a plan view of a first filter element arrangement side off a first filter cassette part.

FIG. 1b is a plan view of a filtrate side of a filter element.

FIG. 1c is a plan view of a second filter element arrangement side of a second filter cassette part.

FIG. 10 is an exploded perspective view of a further embodiment of a filter system.

DETAILED DESCRIPTION

Figure 2:
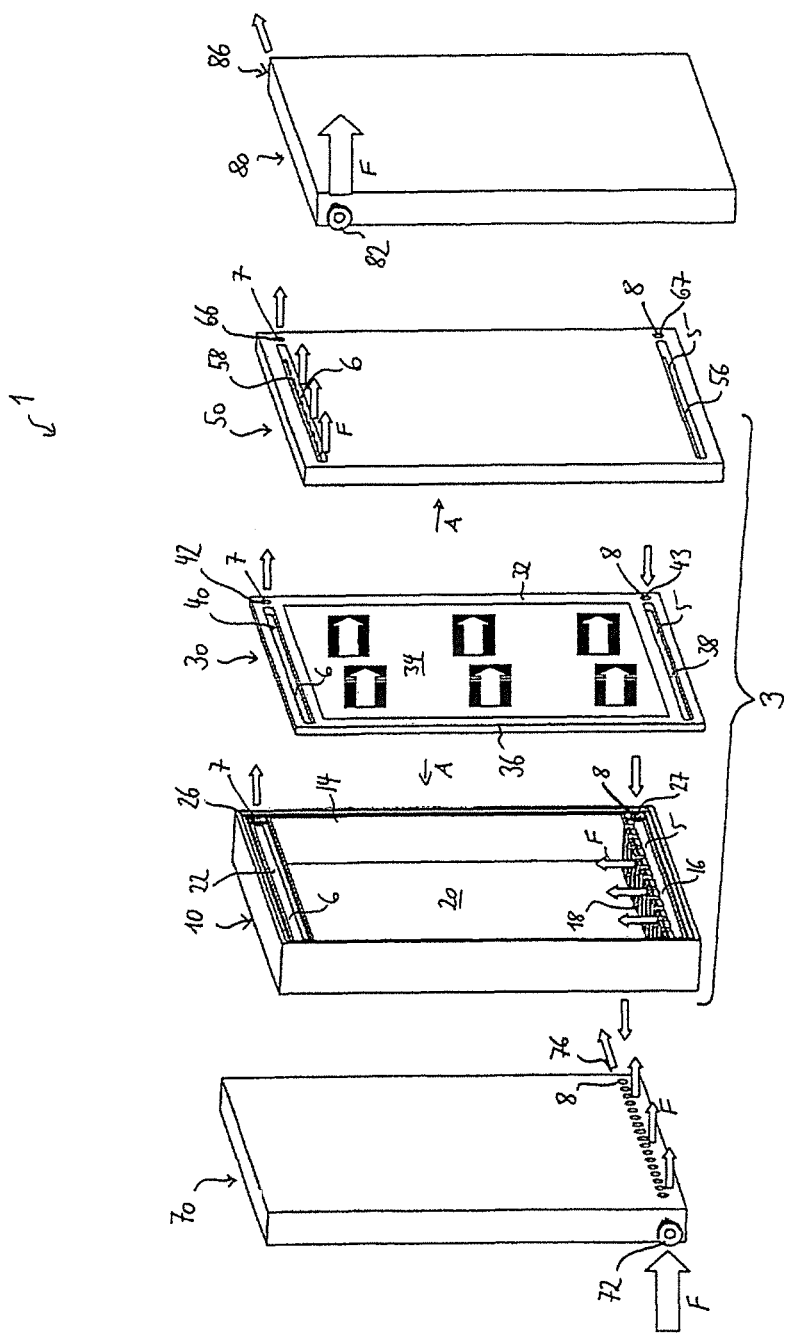
FIG. 2 is an exploded perspective view of one embodiment of a filter system.

FIG. 1a is a plan view of a first filter element arrangement side 12 of a first filter cassette part 10 of a filter module. FIG. 1b is a plan view of a filtrate side 32 (also called permeate side) of a filter element 30. FIG. 1c is a plan view of a second filter element arrangement side 52 of a second filter cassette part 50.

The first filter cassette part 10 is shown in FIG. 1a and has a first filter element receptacle 14, into which the filter element 30 shown in FIG. 1b can be received at least in regions along an arrangement direction A. Here, the arrangement direction A lies substantially perpendicularly on the filter element arrangement side 12. In order to form the filter module, the filter element 30 which is shown in FIG. 1b is introduced into the first filter element receptacle 14 in such a way that a retentate side (not shown) of the filter element 30 that lies opposite the filtrate side 32 faces the first filter element arrangement side 12. The filter element 30 then is introduced along the arrangement direction A into a second filter element receptacle 54 that is shown in FIG. 1c, such that the filtrate side 32 of the filter element 30 faces the second filter element arrangement side 52. The first filter cassette part 10, the filter element 30 and the second filter cassette part 50 are fastened to one another in an arrangement position and then together form the filter module. The fastening can take place by way of latching, locking, screwing, welding or adhesive bonding.

The first filter cassette part 10 has a first cassette inflow channel 16 that is connected fluidically to a retentate chamber 20 by means of a plurality of module inflow connecting channels 18 that are formed in the first filter cassette part 10. It goes without saying that the fluidic connection can also take place by way of merely one module inflow connecting channel 18. The retentate chamber 20 is designed to provide the fluid to be filtered at a retentate side (not shown) of a filter medium 34 of the filter element 30. The depth of the retentate chamber 20 along the arrangement direction A can be selected as desired depending on the expected volume of accumulating retentate. The extent of the first filter cassette part 10 along said direction can then be selected to be correspondingly greater, in order to contain the retentate chamber 20. For example, the retentate chamber 20 can have a depth of approximately 5 mm, approximately mm or approximately 20 mm. If the filter module is to be designed to filter a fluid with a relatively large volume of suspended substances, the depth of the retentate chamber 20 can also be approximately 50 mm, approximately 100 mm, approximately 200 mm or more. Accordingly, the volume of the retentate chamber can be approximately 10 ml, approximately 100 ml, approximately 1 l, approximately 5 l or more than 5 l.

Furthermore, the first filter cassette part 10 has a first cassette outflow channel 22 which does not have a fluidic connection to the retentate chamber 20.

The filter element 30 comprises the filter medium 34 that separates the filtrate side 32 and the retentate side (not shown) of the filter element 30 from one another. The filter medium 34 is fluidically permeable so that filter media-specific substances cannot pass the filter medium 34. Since the fluid flow is directed as intended from the retentate side to the filtrate side 32, the filter media-specific substances remain on the retentate side or remain in the filter medium 34, but substantially do not pass to the filtrate side 32 of the filter element 30 or the filter medium 34. A fluid pressure difference prevails between the retentate side and the filtrate side 32 depending on the applied fluid pressure and the permeability of the filter medium 34.

The filter medium 34 is held by way of a filter medium holder 36 or is fastened to the filter medium holder 36, as a result of which the filter medium is held in its position and in its shape. In the embodiment shown in FIG. 1b, the filter medium holder 36 is formed at least in regions, preferably completely, from a flexible elastic material, such as a silicone, a rubber or a thermoplastic elastomer (TPE). The edge of the filter medium 34 can therefore be welded to the filter medium holder 36 for fastening purposes. If the filter medium holder 36 is formed by solidification of a liquid material (for example, by way of injection molding), the filter medium 34 can be cast with the filter medium holder 36 at least in regions, for example on an edge region of the filter medium 34.

Furthermore, a holder inflow channel 38 and a holder outflow channel 40 are formed in the filter element 30 or the filter medium holder 36. The holder inflow channel 38 and the holder outflow channel 40 preferably are formed as continuous openings in the filter element 30, in particular in the filter medium holder 36.

The second filter cassette part 50 has a second cassette inflow channel 56 that preferably is configured to be congruent in terms of shape with respect to the holder inflow channel 38 and the first cassette inflow channel 16. In the arrangement position, the first cassette inflow channel 16, the holder inflow channel 38 and the second cassette inflow channel are brought into congruence in the direction of the arrangement direction A and are connected fluidically to one another, with the result that they together form one module inflow channel.

Furthermore, the second filter cassette part 50 has a second cassette outflow channel 58 that preferably is configured to be congruent in terms of shape with respect to the holder outflow channel 40 and the first cassette outflow channel 22. In the arrangement position, the first cassette outflow channel 22, the holder outflow channel 40 and the second cassette outflow channel 58 are brought into congruence in the direction of the arrangement direction A and are connected fluidically to one another, with the result that they together form one module outflow channel. The module outflow channel or the second cassette outflow channel 58 is connected fluidically to a filtrate chamber 62 by means of a plurality of module outflow connecting channels 60 that are formed in the second filter cassette part 50. It goes without saying that the fluidic connection can also take place by way of merely one module outflow connecting channel 60. The filtrate chamber 62 is designed to receive the filtered fluid on the filtrate side 32 of the filter medium 34 of the filter element 30. In order to discharge the filtrate as completely as possible via the module outflow channel, the volume of the filtrate chamber 62 is preferably as small as possible. The depth of the filtrate chamber 62 along the arrangement direction A is preferably not more than approximately 10 mm, preferably less than approximately 5 mm and, in particular, approximately 2 mm and less.

The filter element 30 can comprise different filter media 34, such as a membrane filter, a depth filter and/or an adsorption membrane filter. The filter element 30 can also preferably comprise a plurality of identical or different filter media 34. For instance, the filter element 30 can have a plurality of membrane filters in a plurality of layers. A plurality of layers of a depth filter or an adsorption membrane filter can likewise be combined as a filter medium 34. Different filters preferably are combined in one filter element 30. For example, a plurality of layers of a membrane filter can be arranged between at least two layers of a depth filter, such as a nonwoven, or between two screen layers, in order to protect the membrane filter layers against mechanical loading and/or against clogging. The filter medium 34 can comprise, for example, nonwovens, felts, spunbonded fabrics, porous solids, sintered metals, ceramics, woven fabrics, paper, membranes and the like alone or in combination.

During mechanical loading, filter materials can develop breakthrough points, through which the fluid including the substance or substances to be filtered flows, with the result that the filter module is unusable. Furthermore, the filter medium 34 can be contaminated microbiologically or chemically as a result of contact, as a result of which the filter module can likewise become unusable.

In the arrangement position, the filter element 30 is arranged with the filter medium 34 between the first filter cassette part 10 and the second filter cassette part 50 and is protected as a result against external mechanical and chemical influences. In particular, the filter cassette parts 10, 50 prevent contact of the filter medium 34 by hand.

In the embodiment shown in FIG. 1a, furthermore, the first filter cassette part 10 has an optional first cassette ventilating channel 26 that is connected fluidically to the retentate chamber 20. The fluidic connection of the first cassette ventilating channel 26 preferably takes place on that side of the retentate chamber 20 that lies opposite the module inflow connecting channels 18. Furthermore, the first filter cassette part 10 can have a first cassette drainage channel 27 that is not connected fluidically to the retentate chamber 20.

Precisely like the first cassette inflow channel 18 and the first cassette outflow channel 22, the first cassette ventilating channel 26 and the first cassette drainage channel 27 can be formed as a continuous opening in the first filter cassette part 10, the opening preferably having a passage direction that is oriented parallel to the arrangement direction A.

Correspondingly, as shown in FIG. 1c, the second filter cassette part 50 can have an optional second cassette drainage channel 67 that is connected fluidically to the filtrate chamber 62. The fluidic connection of the second cassette drainage channel 67 preferably takes place on that side of the filtrate chamber 62 that lies opposite the module outflow connecting channels 60. Furthermore, the second filter cassette part 50 can have a second cassette ventilating channel 66 that is not connected fluidically to the filtrate chamber 62.

Precisely like the second cassette inflow channel 56 and the second cassette outflow channel 58, the second cassette ventilating channel 66 and the second cassette drainage channel can be formed in each case as a continuous opening in the second filter cassette part 50. The opening preferably has a passage direction that is oriented parallel to the arrangement direction A.

Correspondingly, a holder ventilating channel 42 and a holder drainage channel 43 are formed in the filter element 30 or the filter medium holder 36. The holder ventilating channel 42 and holder drainage channel 43 preferably are formed as continuous openings in the filter element 30, in particular in the filter medium holder 36. The openings preferably have a passage direction that is oriented parallel to the arrangement direction A.

As shown in FIG. 1a, at least one sealing web 28 preferably is formed on the first filter element arrangement side 12 of the first filter cassette part 10 and encircles or encloses the first cassette outflow channel 22. The at least one sealing web 28 can also encircle or enclose the first cassette inflow channel 16, the first cassette ventilating channel 26 and/or the first cassette drainage channel 27. In particular, a single sealing web 28 can encircle or enclose one, a plurality of or all of the four said channels jointly.

The sealing web 28 can protrude by approximately from 0.5 mm to approximately 2 mm, preferably approximately 1 mm. During the arrangement of the filter element 30 on the first filter cassette part 10, the filter element 30 first of all makes contact with the protruding sealing web 28. In the arrangement position, when a contact pressure prevails between the filter element 30 and the first filter cassette part 10, the filter element 30, in particular the filter medium holder 36, which is formed from a flexible material, is deformed or pressed in by the sealing web 28. An improved sealing action is achieved by the increased contact pressure between the filter element 30 and the first filter cassette part 10 in the region of the sealing web 28.

Analogously, as shown in FIG. 1c, at least one sealing web 68 is formed on the second filter element arrangement side 52 of the second filter cassette part 50 and encircles or encloses the second cassette inflow channel 56 and the second cassette drainage channel 67. The at least one sealing web 68 can also encircle or enclose the second cassette outflow channel 58 and/or the first cassette ventilating channel 66. In particular, a single sealing web 68 can encircle or enclose one, a plurality of or all of the four channels jointly.

The sealing web 68 can likewise protrude beyond the second filter element arrangement side 52 of the second filter cassette part 50 along the arrangement direction A by from approximately 0.5 mm to approximately 2 mm, preferably approximately 1 mm. During the arrangement of the filter element 30 on the second filter cassette part 50, the filter element 30 then first of all makes contact with the protruding sealing web 68. In the arrangement position, when a contact pressure prevails between the filter element 30 and the second filter cassette part 50, the filter element 30, in particular the filter medium holder 36, which is formed from a flexible material is deformed or pressed in by the sealing web 68. An improved sealing action is achieved by the increased contact pressure between the filter element 30 and the second filter cassette part 50 in the region of the sealing web 68.

FIG. 2 shows a perspective exploded view of one embodiment of a filter system 1 with a first termination module 70 with a fluid inflow 72 and a second termination module 80 with a fluid outflow 82. A filter module 3, which comprises a first filter cassette part 10, a filter element 30 and a second filter cassette part 50, is arranged between the first termination module 70 and the second termination module 80. The further elements of the filter module 3 correspond to the elements described in relation to FIGS. 1a to 1c and are therefore provided with identical designations. A module inflow channel 5 is formed by the first cassette inflow channel 16, the holder inflow channel 38 and the second cassette inflow channel 56 is connected fluidically to the fluid inflow 72 of the first termination module 70. During proper operational usage of the filter system 1, the fluid to be filtered flows along the fluid flowing direction F. After passing the filter medium 34, the fluid can flow further along the fluid flowing direction F through a module outflow channel 6 to the fluid outflow 82 of the second termination module 80. The module outflow channel 6 is formed by the first cassette outflow channel 22, the holder outflow channel 40 and the second cassette outflow channel 58.

A module ventilating channel 7 is formed in the arrangement position of the filter module 3 by the first cassette ventilating channel 26, the holder ventilating channel 42 and the second cassette ventilating channel 66. At the beginning of a filtration, the module ventilating channel 7 can serve to discharge air that is present in the internal volumes of the filter system 1 without the air being pressed through the filter medium 34. In particular, at the beginning of the filtration, the retentate chambers 20 of the filter system 1 contain a comparatively large air volume in comparison with the air volume in the channels. The module ventilating channel 7 preferably is connected fluidically to a ventilating opening 86 of the second termination module 80.

Correspondingly, a module drainage channel 8 is formed in the arrangement position of the filter module 3 by means of the first cassette drainage channel 27, the holder drainage channel 43 and the second cassette drainage channel 67. At the end of the filtration, the module drainage channel 8 can serve to discharge remaining filtrate from the filtrate chamber or chambers 62 of the filter system 1. The module drainage channel 8 preferably is connected fluidically to an outlet opening 76 of the first termination module 70.

Figure 3:
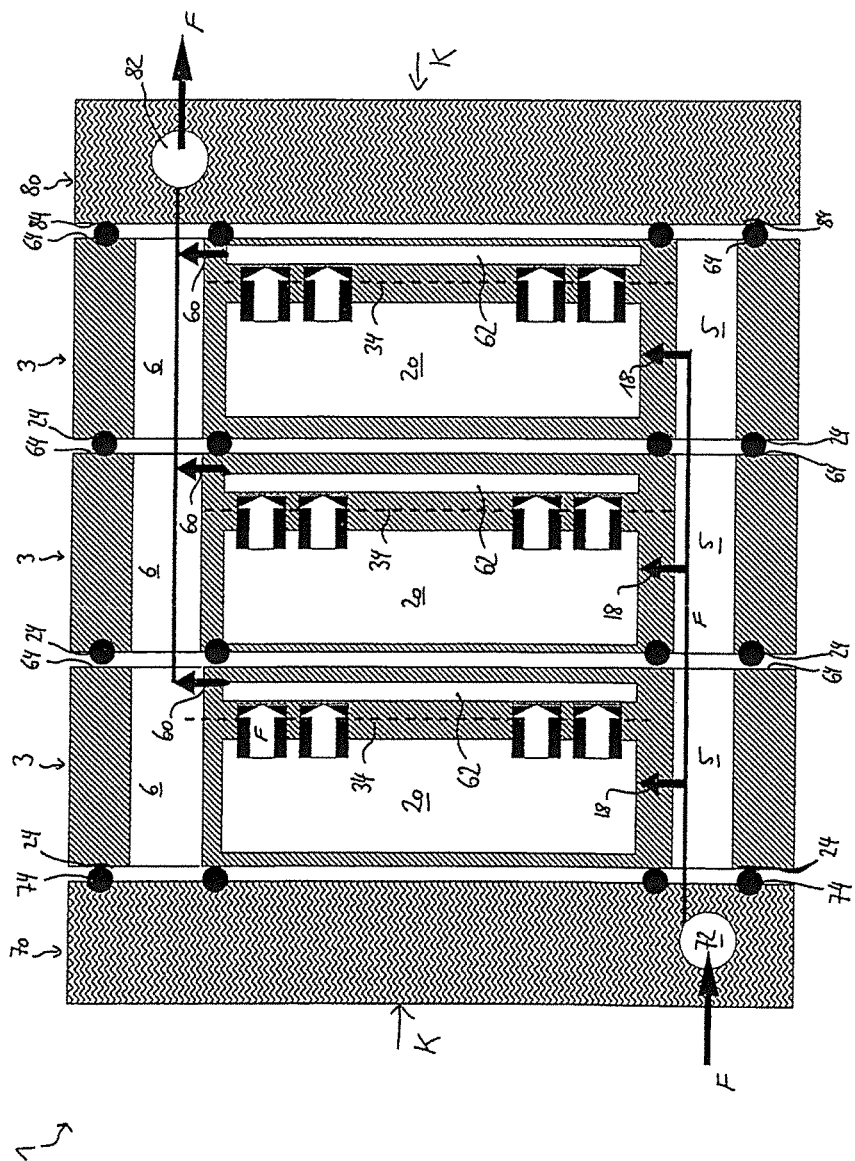
FIG. 3 is a section through one embodiment of a filter system.

FIG. 3 shows a section through one embodiment of a filter system 1 with a first termination module 70, a second termination module 80 and identical filter modules 3. The further elements of the filter module 3 correspond to the elements described in relation to FIGS. 1*a* to 1*c* and 2 and therefore are provided with identical designations.

The filter modules 3 of the filter system 1 are arranged in such a way that the filter modules 3 are operated in parallel. In other words, the retentate chambers 20 of all filter modules 3 are connected fluidically via the inflow channel 5 to the fluid inflow 72 of the first termination module 70. Correspondingly, the filtrate chambers 62 of all filter modules 3 are connected fluidically via the outflow channel 6 to the fluid outflow 82 of the second termination module 80. Starting from the fluid inflow 72, the fluid flows along the fluid flowing direction F via the filter media 34 to the fluid outflow 82.

Any desired number of identical filter modules 3 can advantageously be provided in the filter system 1 in a simple way, in order to scale the filter system with regard to the quantity of the fluid to be filtered.

The fluidic connection between the first termination module 70 and the filter module 3 arranged thereon can take place via a first complementary filter module connection configuration of the first connection module 70. The filter module connection configuration 74 is in contact with or connected to a filter module connection configuration 24 of the filter module 3 in a fluid-tight manner. For example, the first complementary filter module connection configuration 74 can comprise a sealing ring 74 that preferably is held in a corresponding groove in the first connection module 70. The filter module connection configuration 24 preferably comprises a corresponding groove for receiving the sealing ring at least in regions, with the result that a fluid-tight connection is formed between the first connection module 70 and the filter module 3 by way of the sealing ring. It goes without saying that two or more sealing rings can also be provided.

Correspondingly, the further filter modules 3 can be connected among one another in a fluid-tight manner by means of corresponding filter module connection configurations 24 and complementary filter module connection configurations 64. Furthermore, the filter module 3 that is adjacent to the second termination module 80 can be connected to the latter in a fluid-tight manner by means of a complementary filter module connection configuration 64 and a second filter module connection configuration 84 of the second termination module 80.

In the illustrated embodiment, the termination modules 70, 80 and the filter modules 3 that are arranged between them are loaded by a pressing apparatus (not shown) with a pressing force K, as a result of which the filter module connection configurations 24, 84 and the associated complementary filter module connection configurations 64, 74 are loaded with a predefined contact pressure. As a result, the sealing rings that are arranged between the modules are deformed elastically, as a result of which the fluid-tight seal advantageously is increased during proper operational usage of the filter system 1.

Further preferably, the first and second filter cassette parts 10, 50 of each of the filter modules 3 are displaced with respect to one another by the pressing force K, since the associated elastic filter element 30 and/or the elastic filter medium holder 36 are/is compressed. As a result, the sealing webs 28, 68 preferably are pressed into the elastic material of the filter medium holder 36, as a result of which the fluid-tight seal of the filter module 3 is increased.

It is advantageous during proper operational usage to arrange the inflow channel 5 below the outflow channel 6, with the result that, during flow along the fluid flowing direction F, the fluid moves within the internal volumes of the filter system 1, such as the retentate chambers 20 and the filtrate chamber 62, counter to gravity, as a result of which gas bubbles are removed from said internal volumes and are conveyed in the direction of the fluid outflow 82.

Figure 4:
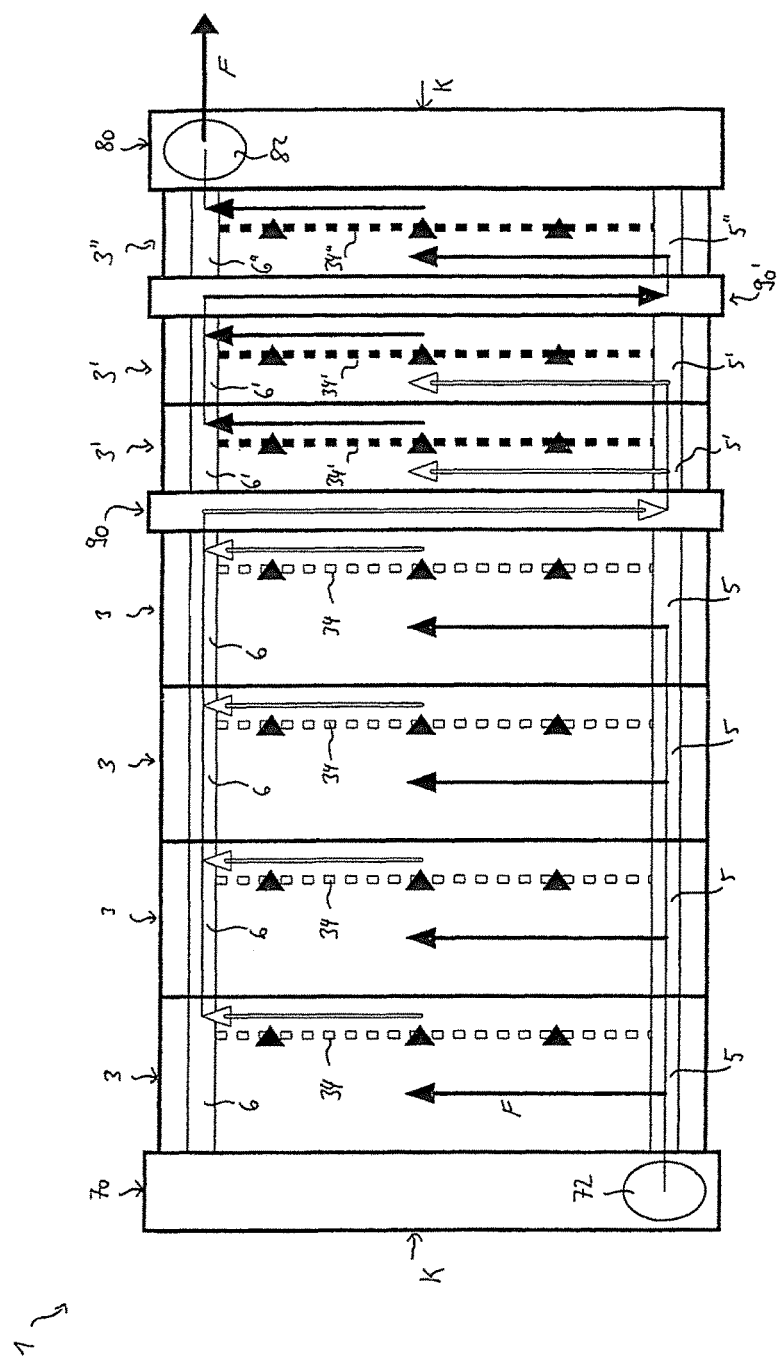
FIG. 4 is a section through a further embodiment of the filter system.

FIG. 4 shows a section through a further embodiment of a filter system 1 with a first termination module 70, a second termination module 80 and four identical filter modules 3, two further filter modules 3' that are different from the former and identical to one another, and a further filter module 3" that is different from them. The further elements of the filter modules 3 correspond to the elements that are described in relation to FIGS. 1*a* to 1*c*, 2 and 3 and are therefore provided with identical designations. The elements of the filter modules 3' and 3" correspond to the elements of the filter modules 3 and, in so far as they are identical with them, are provided with designations with a prime or with two primes.

The four filter modules 3 of the filter system 1 are arranged in such a way that the filter modules 3 are operated in parallel, as is described in relation to FIG. 3. Two further filter modules 3' are connected in series to the four filter modules 3. To this end, the module inflow channel 5' of the two filter modules 3' is connected fluidically to the module outflow channel 6 of the filter modules 3 by means of a first separating module 90. Furthermore, the first separating module 90 closes the module inflow channel 5 that is formed by the four filter modules 3. As a result, the module inflow channel 5 is separated fluidically from the module inflow channel 5' that is formed by the two filter modules 3'.

A further filter module 3" is connected in series to the two filter modules 3', by the module inflow channel 5" of the filter module 3" being connected fluidically to the module outflow channel 6' of the filter modules 3' by means of a second separating module 90'. Correspondingly, the second separating module 90' closes the module inflow channel 5'. As a result, the module inflow channel 5' is separated fluidically from the module inflow channel 5" that is formed by the filter module 3".

Different filter methods can therefore advantageously be applied one after another to one fluid by way of one filter system. For example, the fluid in the filter modules 3 can first of all be freed from suspended substances by suspended substance filters 34. The retentate chambers of the filter modules 3 therefore preferably are formed with a greater volume than the retentate chambers of the adjoining filter modules 3' and 3". Membrane adsorption filters 34' can subsequently be provided to adsorb a substance that is dissolved in the fluid, and finally a sterile filter 34" in the filter module 3" can prevent microorganisms, such as bacteria, funguses, viruses or the like, from passing to the fluid outflow 82 and from there into the environment.

Figure 5:
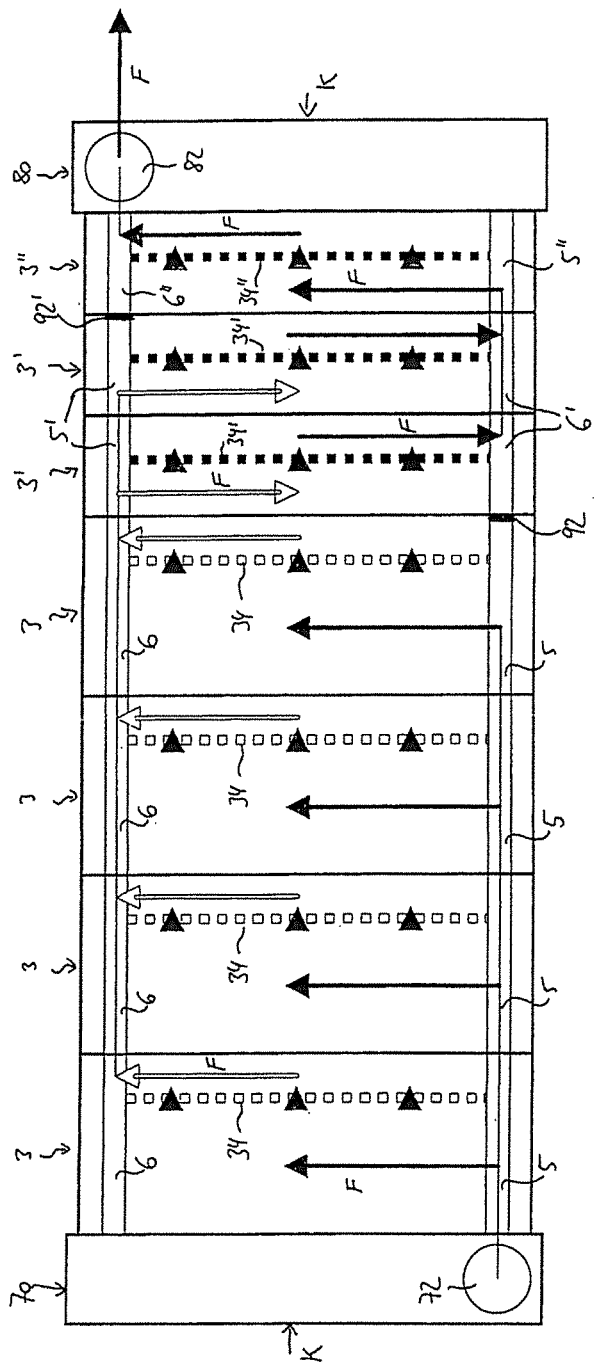
FIG. 5 is a section through a further embodiment of the filter system.

FIG. 5 shows a section through a further embodiment of a filter system 1 with a first termination module 70, a second termination module 80 and four identical filter modules 3, two further filter modules 3' that are different from the former and are identical to one another, and a further filter module 3" that is different from them. This arrangement corresponds substantially to the embodiment shown in FIG. 4, and identical elements are provided with identical designations.

Like the embodiment shown in FIG. 4, the four filter modules 3 are operated in parallel, the two further filter modules 3' then being connected thereto in series. Finally, a filter module 3" that is connected in series follows. In contrast to the embodiment shown in FIG. 4, the filter system of FIG. 5 does not have any separating modules that are designed to fluidically connect the module inflow channel of following filter modules to the module outflow channel of the preceding filter modules.

In contrast to this, the filter system 1 shown in FIG. 5 has a first separating device 92 that closes the module inflow channel 5 that is formed by the four filter modules 3, in order to separate the module inflow channel 5 from the module outflow channel 6' that adjoins it and is formed by the two filter modules 3'. Furthermore, the filter system 1 has a second separating device 92' that closes the module inflow channel 5' that is formed by the two filter modules 3', in order to separate the module inflow channel 5' from the module outflow channel 6" that adjoins it and is formed by the filter module 3".

The separating devices 92, 92' can advantageously be of particularly simple configuration, since merely fluidic separation takes place by the separating devices. In particular, the first and second separating device 92, 92' can be configured in each case as a fluid-impermeable film. The film of the first separating device 92 can be arranged over the full surface area, between the filter modules 3 and 3'. As a result, the module outflow 5 and the module inflow 6' are separated by the film, whereas the separating device 92 has a continuous opening in the region of the module outflow channel 6 and the adjoining module inflow channel 5', through which continuous opening a fluid can flow from the module outflow channel 6 to the module inflow 5'. As an alternative, the separating devices 92, 92' can be configured as closures that are introduced into the corresponding channels, in order to close them, before the arrangement of the filter modules 3, 3', 3" in order to form the filter system 1.

As shown in FIG. 5, the module inflow channel 5' of the filter modules 3' is arranged above the module outflow channel 6'. As a result, during proper operational usage of the filter system 1, the fluid to be filtered flows in the filter modules 3' substantially along the direction of gravity from top to bottom. In the filter module 3" that follows the filter modules 3' in series, the fluid again flows counter to the direction of gravity from bottom to top in the direction of the fluid outflow 82.

Figure 6A:
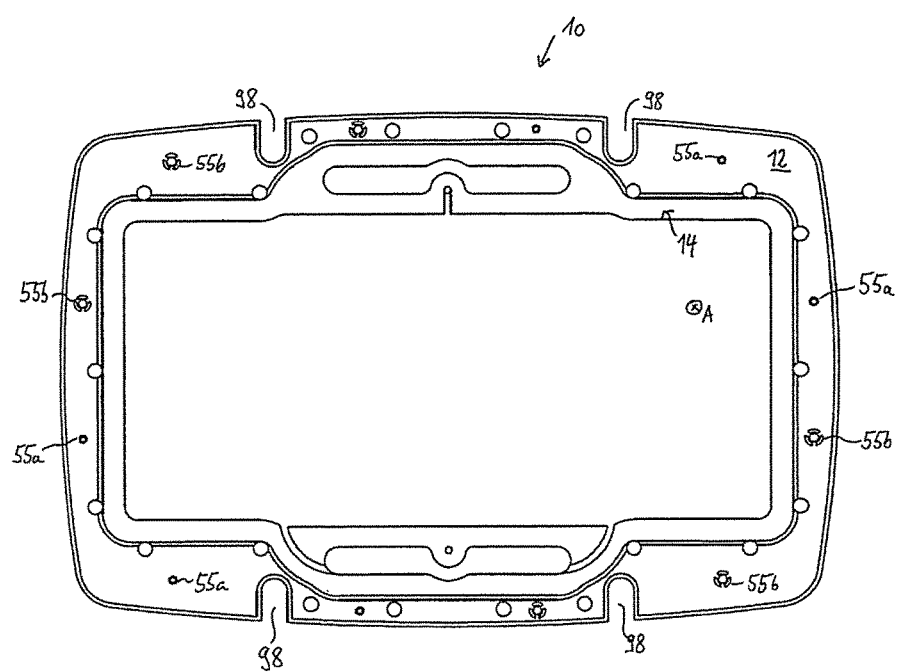
FIG. 6a is a plan view of a further embodiment of a first filter cassette part.
Figure 6B:
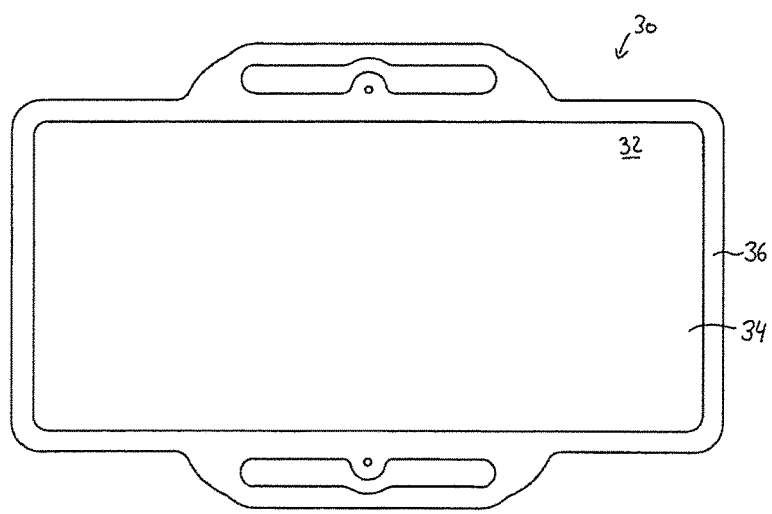
FIG. 6b is a plan view of a further embodiment of a filter element.
Figure 6C:
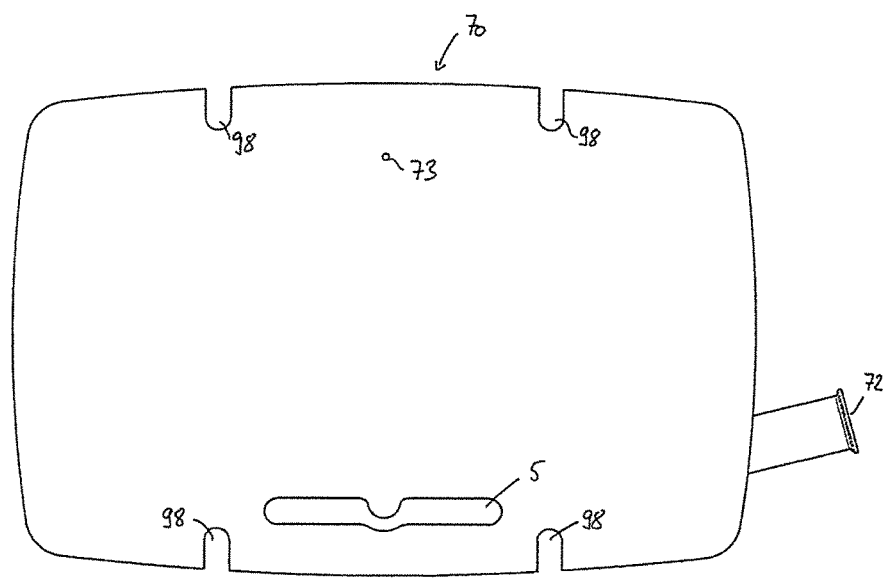
FIG. 6c is a plan view of a further embodiment of a termination module.
Figure 7:
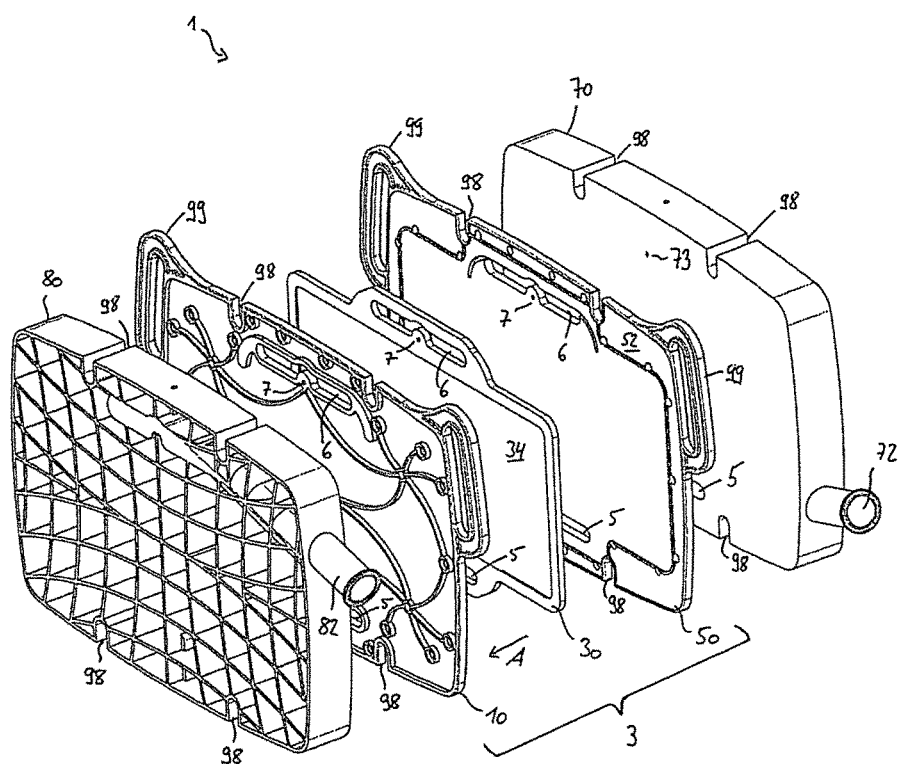
FIG. 7 is an exploded perspective view of a further embodiment of a filter system.

FIG. 6a shows a plan view of a first filter element arrangement side 12 of a further embodiment of a first filter cassette part 10 of a filter module. FIG. 6b shows a plan view of a filtrate side 32 (also called permeate side) of a further embodiment of a filter element 30. FIG. 6c shows a plan view of a further embodiment of a first termination module 70. FIG. 7 shows a perspective exploded view of one embodiment of a filter system 1 with a first termination module 70 with a fluid inflow 72 and a second termination module 80 that is of identical configuration to the first termination module 70, with a fluid outflow 82. A filter module 3 is arranged between the first termination module and the second termination module 80. The filter module 3 comprises a first filter cassette part 10, a filter element 30 and a second filter cassette part 50 that is of identical configuration to the first filter cassette part 10. The function of the filter system 1 corresponds substantially to that of the embodiment shown in FIGS. 1a to 1c and 2. As a result, corresponding elements are provided with identical designations and reference is made to the description of FIGS. 1a to 1c and 2 with respect to the description of the function of the filter system 1 and its constituent parts.

The first filter cassette part 10 is shown in FIG. 6a and has a first filter element receptacle 14, into which the filter element 30 shown in FIG. 6b can be received at least in regions along an arrangement direction A. Here, the arrangement direction A lies substantially perpendicularly on the filter element arrangement side 12. In order to form the filter module, the filter element 30 shown in FIG. 6b is introduced into the first filter element receptacle 14 in such a way that a retentate side (not shown) of the filter element 30, which retentate side lies opposite the filtrate side 32, faces the first filter element arrangement side 12. The filter element 30 then is introduced along the arrangement direction A into a second filter element receptacle 54 (shown in FIG. 7) that is identical to that shown in FIG. 6a, such that the filtrate side 32 of the filter element 30 faces the second filter element arrangement side 52. The first filter cassette part 10, the filter element 30 and the second filter cassette part 50 are fastened to one another in an arrangement position and then together form the filter module 3 (shown in FIG. 7).

The fastening of the first filter cassette part 10, the filter element 30 and the second filter cassette part 50 to one another can take place by latching, locking, screwing, welding or adhesive bonding. To this end, for example, at least one latching element 55a can be provided on the first filter cassette part 10. The latching element 55a is designed to latch releasably or non-releasably with complementary latching elements 55b of the second filter cassette part 50. Since the first and second filter cassette parts 10, 50 can be identical to one another, the first filter cassette part 10 can additionally have at least one complementary latching element 55b that is designed to latch releasably or non-releasably with latching elements 55a of the second filter cassette part 50. In particular, the first filter cassette part 10 has an identical number of latching elements 55a and complementary latching elements 55b.

For fastening to the filter medium holder 36, the edge of the filter medium 34 can be bonded adhesively to the filter medium holder 36 and/or can be clamped fixedly on the filter medium holder 36. For example, the filter medium holder 36 can be configured in two parts, the first part of the filter medium holder 36 having a filter medium receptacle that is designed to receive the filter medium 34 along an introduction direction E, whereas the second part of the filter medium holder 36 clamps the filter medium 34 fixedly in the filter medium receptacle by way of a clamping region that is configured to be substantially complementary with respect to the filter medium receptacle, by way of being introduced at least in regions into the filter medium receptacle. In addition, the filter medium can be bonded fixedly in the filter medium receptacle by means of an adhesive.

As an alternative, the filter medium 34 can be fastened to the filter medium holder 36 by means of an adhesive, for example a polymer or a silicone adhesive. To this end, the filter medium holder 36 can have a groove. The filter medium 34 can be inserted and adhesively bonded fixedly. The filter medium holder preferably is configured in one piece. Since the filter medium holder 36 preferably is formed from a flexible material, such as an elastomer, the filter medium holder 36 can be deformed at least in regions, for example expanded or bent, in order to insert the filter medium 34 into the groove.

The construction, the function and the assembly of the filter module 3 from the filter element 30, the first filter cassette part 10 and the second filter cassette part 50, and the filter system 1 that is equipped with this and is shown in FIG. 7 are described in relation to FIGS. 1a to 1c and 2.

FIG. 6c shows one preferred embodiment of a first termination module 70. The first termination module comprises a fluid inflow 72 that is connected fluidically to the module inflow channel 5. Furthermore, the first termination module 70 has a ventilating opening 73 that can be connected fluidically to the module ventilating channel 7.

Two of the termination modules of FIG. 6c are necessary to form the filter system that is shown in FIG. 7. Here, the second termination module 80 is rotated by 180° relative to the first termination module 70. The elements fluid inflow 72, module inflow channel 5 and ventilating opening 73, which are shown in FIG. 6c, then correspondingly become the fluid outflow 82, module outflow channel 6 and drainage opening 83 and can be connected fluidically to the module drainage channel 8.

The filter system 1 shown in FIGS. 6a to 6c and 7 can be mounted on a filter system holder (not shown) that has, for example, two supports, tubes or rods that are parallel to one another and spaced apart from one another and can be received at least in regions by the holder receptacles 98 of the filter system 1. As a result, a displacement of the individual elements of the filter system 1 in a direction different from, in particular perpendicular with respect to, the arrangement direction A can be prevented. In particular, threaded rods can be introduced into the holder receptacles 98, and securing elements that are provided with a complementary thread to be screwed on both sides on each threaded rod in such a way that the securing elements in each case apply a pressing force onto a termination module 70, 80, and the securing elements press together with the filter modules 3 that are situated between them.

For improved handling of the filter system 1, the filter module 3 can have at least one handle 99, by way of which the filter system can be gripped and transported manually or automatically.

FIGS. 8a to 8d show sections through different preferred embodiments of a filter medium holder 36 with a filter medium 34 fastened thereto.

Figure 8A:
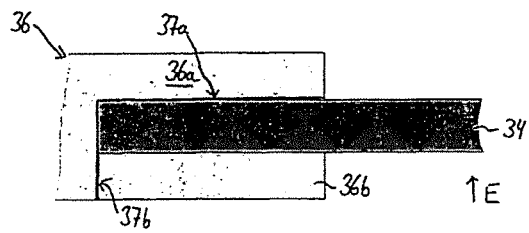
FIG. 8a is a sectional view through one embodiment of a filter system.

FIG. 8a shows a section through a filter medium holder 36 with a filter medium 34 arranged therein and fastened to the filter medium holder by having a region of the filter medium clamped fixedly with the filter medium holding region.

As shown in FIG. 8a, the filter medium holder 36 can be configured in two pieces, the first part 36a of the filter medium holder 36 having a filter medium receptacle 37a that is designed to receive the filter medium 34 along an introduction direction E. Furthermore, the second part 36b of the filter medium holder can have a clamping region 37b that is configured to be substantially complementary with respect to the filter medium receptacle 37a and can be introduced at least in regions into the filter medium receptacle 37a along the introduction direction E, in order to clamp the filter medium 34 fixedly in the filter medium receptacle 37a. Further preferably, the filter medium 34 additionally is bonded fixedly in the filter medium receptacle 37a by an adhesive, for example by way of a polymer or a silicone adhesive. The second part 36b of the filter medium holder 36 preferably is bonded fixedly in the filter medium receptacle 37a by an adhesive.

Figure 8B:
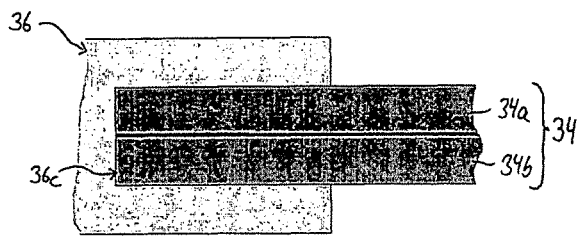
FIG. 8b is a sectional view through a further embodiment of a filter element.

As shown in FIG. 8b, the filter medium 34 can be formed from two, three or more layers 34a, 34b, or two, three or more filter media 34 can be received in the filter medium holder 36 or can be fastened thereto. Here, the filter medium 34 can be formed by way of a multiplicity of identical layers 34a, 34b or by way of different layers 34a, 34b.

Furthermore, the filter medium 34 can be fastened to the filter medium holder 36 by means of an adhesive, for example a polymer or a silicone adhesive. To this end, the filter medium holder 36 can have a groove 36c, into which the filter medium 34 can be inserted and adhesively bonded fixedly. The filter medium holder 36 preferably is configured in one piece. It goes without saying that a filter medium 34 that is formed from a plurality of layers can likewise be held by the filter medium holder 36 that is shown in FIG. 8a, and the filter medium 34 that is formed from a single layer can also be held by the filter medium holders 36 shown in FIGS. 8b to 8d.

Figure 8C:
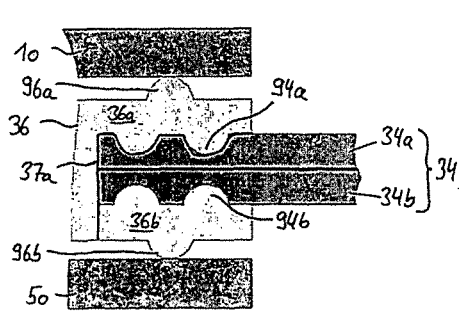
FIG. 8c is a sectional view through a further embodiment of the filter element that is arranged between two filter cassette parts.

As shown in FIG. 8c, the filter medium receptacle 37a can have at least one sealing contour 94a, for example a sealing lip 94a. Furthermore, the clamping region 37b can likewise have at least one sealing contour 94b, for example a sealing lip 94b. The sealing contours 94a, 94b can be configured in such a way that the sealing contours 94a, 94b run around an opening in the filter medium holder 36 that is closed by the filter medium 34. In other words, the sealing contours 94a, 94b can seal the edge region of the filter medium 34 completely. The filter medium 34 can be arranged or clamped between the sealing contour 94a of the filter medium receptacle 37a and the sealing contour 94b of the clamping region 37b. As a result, the filtrate side and the retentate side of the filter medium 34 can advantageously be separated in a fluid-tight manner. It goes without saying that two, three, four or more sealing contours 94a, 94b can also be arranged parallel to one another. Furthermore, sealing contours 94a, 94b can preferably also be provided in the embodiment (shown in FIG. 8b) of the filter medium holder 36, the sealing contours 94a, 94b then expediently being arranged in the groove 36c.

The filter medium holder 36 can preferably have at least one first seal region 96a that is designed to make contact with the first filter cassette part 10 in the arrangement position. Further preferably, the first seal region 96a is of flexible or elastic configuration. In particular, the first seal region 96a can be configured in one piece with the filter medium holder 36.

Correspondingly, the filter medium holder 36 can have at least one second seal region 96b that is designed to make contact with the second filter cassette part 50 in the arrangement position. Further preferably, the second seal region 96b is configured to be flexible or elastic, in particular in one piece with the filter medium holder 36.

Figure 8D:
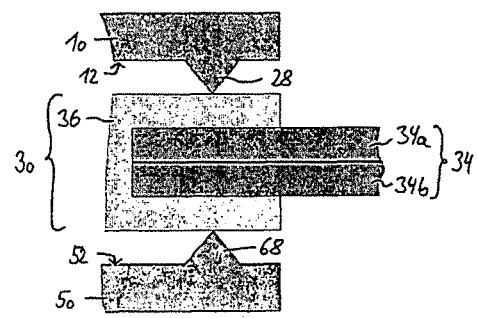
FIG. 8d is a sectional view through the embodiment of FIG. 8b that is arranged between two filter cassette parts.

As shown in FIG. 8d, at least one sealing web 28 can be formed on the first filter element arrangement side 12 of the first filter cassette part 10. The at least one sealing web 28 can preferably protrude beyond the filter element arrangement side 12 along the arrangement direction A by from approximately 0.5 mm to approximately 2 mm, preferably approximately 1 mm. When the filter element 30 or the filter medium holder 36 is arranged on the first filter cassette part 10, the filter element 30 or the filter medium holder 36 first of all makes contact with the protruding sealing web 28. In the arrangement position when a contact pressure prevails between the filter element 30 and the first filter cassette part 10, the filter element 30 that is formed from a flexible material, in particular the filter medium holder 36, is deformed or pressed in by the sealing web 28. An improved sealing action is achieved by way of the increased contact pressure between the filter element 30 and the first filter cassette part 10 in the region of the sealing web 28.

Analogously, as shown in FIG. 8d, at least one sealing web 68 is formed on the second filter element arrangement side 52 of the second filter cassette part 50. The sealing web 68 can likewise protrude beyond the second filter element arrangement side 52 of the second filter cassette part 50 along the arrangement direction A by from approximately 0.5 mm to approximately 2 mm, preferably approximately 1 mm. When the filter element 30 is arranged on the second filter cassette part 50, the filter element 30 then first of all makes contact with the protruding sealing web 68. In the arrangement position when a contact pressure prevails between the filter element 30 and the second filter cassette part 50, the filter element 30, which is formed from a flexible material, in particular the filter medium holder 36, is deformed or pressed in by the sealing web 68. An improved sealing action is achieved by the increased contact pressure between the filter element 30 and the second filter cassette part 50 in the region of the sealing web 68.

Figure 9:
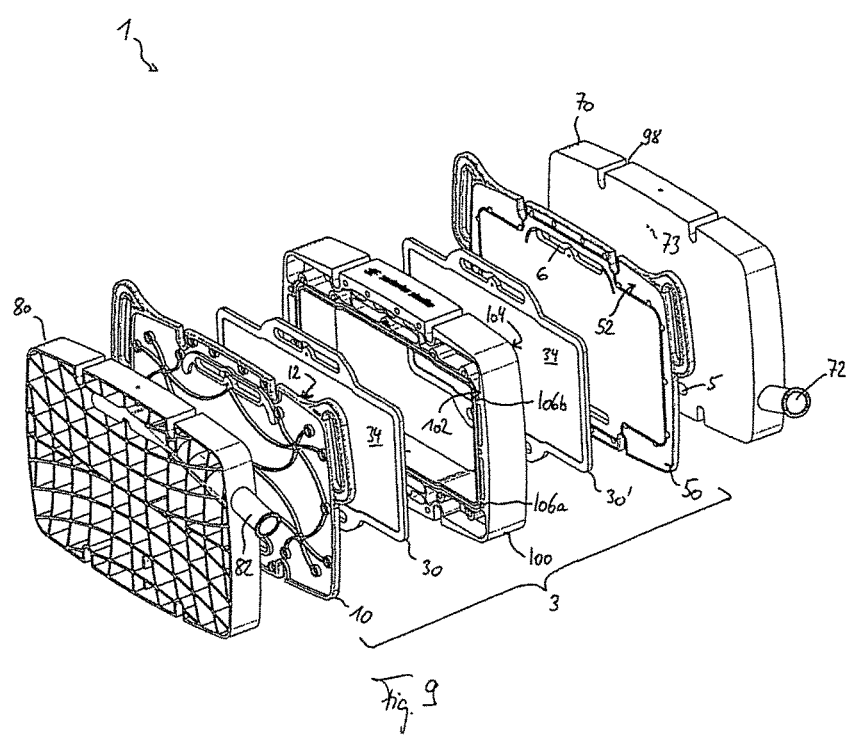
FIG. 9 is an exploded perspective view of a further embodiment of the filter system.

FIG. 9 shows a perspective exploded view of a further embodiment of a filter system 1 with a first termination module 70 with a fluid inflow 72 and a second termination module 80 that is configured to be identical with respect to the first termination module 70, with a fluid outflow 82. A filter module 3 is arranged between the first termination module 70 and the second termination module 80. The filter module 3 comprises a first filter cassette part 10, two filter elements 30, 30', a second filter cassette part 50 that is configured to be identical with respect to the first filter cassette part 10, and a third filter cassette part 100 that is arranged between the two filter elements 30, 30'. The function of the filter system 1 corresponds substantially to that of the embodiment shown in FIGS. 6a to 6c and 7 or the embodiment shown in FIGS. 1a to 1c and 2. As a result, corresponding elements are provided with identical designations and reference is made to the description of FIGS. 1a to 1c, 2, 6a to 6c and 7 with respect to the description of the function of the filter system 1 and its constituent parts.

The second filter element 30' is preferably identical to the first filter element 30. In this configuration, the first filter element 30 is arranged or received on the first filter cassette part 10, and the second filter element 30' is arranged or received on the second filter cassette part 50. The third filter cassette part 100 is arranged between the first filter element 30 and the second filter element 30'.

The third filter cassette part 100 preferably has a third filter element arrangement side 102 that is identical to the second filter element arrangement side 52 of the second filter cassette part 50. Further preferably, the third filter cassette part 100 has a fourth filter element arrangement side 104 that is identical to the first filter element arrangement side 12 of the first filter cassette part 10. For example, the third filter cassette part 100 can be formed by a connection or common formation of a first and second filter cassette part 10, 50.

Two filter elements 30, 30' can be accommodated in a single filter module 3 by means of the third filter cassette part 100. Here, the third filter cassette part 100 with the first and second filter cassette part 10, 50 can be locked or latched to one another releasably or non-releasably in the arrangement position by means of correspondingly arranged latching devices 106a and/or complementary latching devices 106b. The locking between the first and second filter cassette part 10, 50 preferably is replaced by indirect locking via the third filter cassette part 100. It goes without saying that the first, second and third filter cassette part 10, 50, 100 can also be locked to one another jointly by means of one locking device.

FIG. 10 shows a perspective exploded view of a further embodiment of a filter system 1 with a first termination module 70 with a fluid inflow 72 and a second termination module 80 that is configured to be identical with respect to the first termination module 70, with a fluid outflow 82. A filter module 3 is arranged between the first termination module 70 and the second termination module 80. The filter module 3 comprises a first filter cassette part 10, a multiplicity of filter elements 30, a second filter cassette part 50 that is configured to be identical to the first filter cassette part 10, and a third filter cassette part 100 that is arranged in each case between two of the multiplicity of filter elements 30. The number of third filter cassette parts 100 therefore corresponds to the number of filter elements 30 minus one.

The function of the filter system 1 corresponds substantially to that of the filter system shown in FIG. 9, the use of a multiplicity of filter elements that are identical or different from one another being made possible. The elements that are identical in relation to FIG. 9 are provided with identical designations, and reference is made to the description associated with FIG. 9 to describe the elements.

LIST OF DESIGNATIONS

1 Filter system
3, 3', 3" Filter module
5 Module inflow channel
6 Module outflow channel
7 Module ventilating channel
8 Module drainage channel
10 First filter cassette part
12 First filter element arrangement side
14 First filter element receptacle
16 First cassette inflow channel
18 Module inflow connecting channel
20 Retentate chamber 22 First cassette outflow channel
24 Filter module connection configuration
26 First cassette ventilating channel
27 First cassette drainage channel
28 Sealing web
30 Filter element
32 Filtrate side
34 Filter medium
34a First layer of the filter medium 34
34b Second layer of the filter medium 34
36 Filter medium holder
36a First part of the filter medium holder 36
36b Second part of the filter medium holder 36
36c Groove
37a Filter medium receptacle
37b Clamping region
38 Holder inflow channel
40 Holder outflow channel
42 Holder ventilating channel
43 Holder drainage channel
50 Second filter cassette part
52 Second filter element arrangement side
54 Second filter element receptacle
55a Latching element
55b Complementary latching element
56 Second cassette inflow channel
58 Second cassette outflow channel
60 Module outflow connecting channel
62 Filtrate chamber
64 Complementary filter module connecting configuration
66 Second cassette ventilating channel
67 Second cassette drainage channel
68 Sealing web
70 First termination module
72 Fluid inflow
74 First complementary filter module connecting configuration
76 Outlet opening
80 Second termination module
82 Fluid outflow
84 Second filter module connecting configurations
86 Ventilating opening
90 First separating module
90' Second separating module
92, 92' Separating device
94a, 94b Sealing contour, sealing lip
96a, 96b Seal region
98 Holder receptacle
99 Handle
100 Filter cassette part
102 Third filter element arrangement side
104 Fourth filter element arrangement side
106a Latching device
106b Complementary latching device
A Arrangement direction
E Introduction direction
F Fluid flowing direction
K Pressing force

The invention claimed is:

1. A modular filter system, (1) comprising:
a first termination module (70),
a second termination module (80),
a separating module (90) between the first and second termination modules (70, 80),
a first filter module (3) between the first termination module (70) and the separating module (90),
a second filter module (3') between the second termination module (80) and the separating module (90),
each of the first and second filter modules (3, 3') including:
a filter element (30) having
at least one filter medium (34) that separates a filtrate side (32) and a retentate side of the filter element (30) from one another, and
a filter medium holder (36), to which the filter medium (34) is fastened, and which filter medium holder (36) has at least one holder inflow channel (38) and at least one holder outflow channel (40),
a first filter cassette part (10) having at least one first cassette inflow channel (16) and at least one first cassette outflow channel (22),
a second filter cassette part (50) having at least one second cassette inflow channel (56) and at least one second cassette outflow channel (58),
the filter medium holder (36) being arranged in an arrangement position in a fluid-tight manner between the first filter cassette part (10) and the second filter cassette part (50),
the at least one holder inflow channel (38) being connected fluidically to the at least one first cassette inflow channel (16) and the at least one second cassette inflow channel (56) to form a module inflow channel (5),
the at least one holder outflow channel (40) being connected fluidically to the at least one first cassette outflow channel (22) and the at least one second cassette outflow channel (58) to form a module outflow channel (6),
the module inflow channel (5) being connected fluidically to the retentate side of the filter medium (34), and
the module outflow channel (6) being connected fluidically to the filtrate side (32) of the filter medium (34), wherein:
the module inflow channel (5) of the first filter module (3) being connected fluidically to a fluid inflow (72) of the first termination module (70),
the module outflow channel (6) of the at least one filter module (3) being connected fluidically to a fluid outflow (82) of the second termination module (80), and
the separating module (90) closes the module inflow channel (5) of the first filter module (3) in a direction of the second filter module (3'), connects the module outflow channel (6) of the first filter module (3) fluidically to the module inflow channel (5') of the second filter module (3') and closes the module outflow channel (6') of the second filter modulel (3') in a direction of the first filter module (3).

2. The modular filter system (1) of claim 1, wherein the first filter cassette part (10) and the second filter cassette part (50) of each of the filter modules (3, 3') are configured to be locked by a locking device.

3. The modular filter system (1) of claim 1, wherein each of the filter medium holders (36) is formed from a flexible elastic material that is compressed by at least one of the first filter cassette part (10) and the second filter cassette part (50).

4. The modular filter system (1) of claim 1, wherein each of the first filter cassette parts (10) has a first filter element receptacle (14) and/or each of the second filter cassette parts (50) has a second filter element receptacle (54), into which the respective filter medium holder (36) can be received at least in regions along an arrangement direction (A).

5. The modular filter system (1) of claim 4, wherein at least one of the first and second filter element receptacles (14, 54) is configured so that the respective first and second filter cassette parts (10, 50) are spaced apart from one another in the arrangement position by the filter medium holder (36).

6. The modular filter system (1) of claim 1, wherein the filter medium (34) is arranged on the filter medium holder (36) of each of the filter modules (3, 3') in a non-positive or positively locking manner.

7. The modular filter system (1) claim 1, wherein each of the filter medium holders (36) is configured from a flexible elastic material.

8. The modular filter system (1) of claim 7, wherein the filter medium (34) is clamped in the respective filter medium holder (36) with a pressing force applied to the filter medium (34) by the flexible material of the respective filter medium holder (36).

9. The modular filter system (1) of claim 1, wherein the filter medium (34) is fastened to the respective filter medium holder (36) by fusing or casting a region of the filter medium (34) to a region of the filter medium holder (36).

10. The modular filter module system (1) of claim 1, further comprising:
    a third filter cassette part (100) and
    a second filter element (30'),
    the second filter element (30') being arranged on the second filter cassette part (50), and
    the third filter cassette part (100) being arranged between the first filter element (30) and the second filter element (30').

11. The modular filter system (1) of claim 10, comprising two or more third filter cassette parts (100) arranged between the first and the second filter element (30, 30'), each of the third filter cassette parts being assigned an additional filter element (30).

12. A filter system (1), comprising:
    a first termination module (70),
    a second termination module (80),
    a first filter module (3) between the first and second termination modules (70),
    a second filter module (3') between the first filter module (3) and the second termination module (80),
    each of the first and second filter modules (3, 3') including:
    a filter element (30) having
        at least one filter medium (34) which separates a filtrate side (32) and a retentate side of the filter element (30) from one another, and
        a filter medium holder (36), to which the filter medium (34) is fastened, and which filter medium holder (36) has at least one holder inflow channel (38) and at least one holder outflow channel (40),
    a first filter cassette part (10) having at least one first cassette inflow channel (16) and at least one first cassette outflow channel (22),
    a second filter cassette part (50) having at least one second cassette inflow channel (56) and at least one second cassette outflow channel (58),
    the filter medium holder (36) being arranged in an arrangement position in a fluid-tight manner between the first filter cassette part (10) and the second filter cassette part (50),
    the at least one holder inflow channel (38) being connected fluidically to the at least one first cassette inflow channel (16) and the at least one second cassette inflow channel (56) to form a module inflow channel (5),
    the at least one holder outflow channel (40) being connected fluidically to the at least one first cassette outflow channel (22) and the at least one second cassette outflow channel (58) to form a module outflow channel (6),
    the module inflow channel (5) being connected fluidically to the retentate side of the filter medium (34), and
    the module outflow channel (6) being connected fluidically to the filtrate side (32) of the filter medium (34),
    the module inflow channel (5) of the first filter module (3) being connected fluidically to a fluid inflow (72) of the first termination module (70),
    the module outflow channel (6') of the second filter module (3') being connected fluidically to a fluid outflow (82) of the second termination module (80), and
    a separating device (92) that closes the module inflow channel (5) of the first filter module (3) so that the module inflow channel (5) of the first filter module (3) is separated fluidically from the module outflow channel (6') of the second filter module (3').

* * * * *